United States Patent
Kiwan et al.

(10) Patent No.: US 11,466,639 B2
(45) Date of Patent: Oct. 11, 2022

(54) METHOD AND SYSTEM FOR FUEL INJECTOR BALANCING

(71) Applicant: Ford Global Technologies, LLC, Dearborn, MI (US)

(72) Inventors: Rani Kiwan, Canton, MI (US); Ross Pursifull, Dearborn, MI (US); Joseph Lyle Thomas, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 5 days.

(21) Appl. No.: 17/093,384

(22) Filed: Nov. 9, 2020

(65) Prior Publication Data

US 2022/0145822 A1     May 12, 2022

(51) Int. Cl.
*F02D 41/24* (2006.01)
*F02D 41/22* (2006.01)

(52) U.S. Cl.
CPC ......... *F02D 41/2451* (2013.01); *F02D 41/22* (2013.01); *F02D 2041/224* (2013.01); *F02D 2200/0602* (2013.01); *F02D 2200/0614* (2013.01)

(58) Field of Classification Search
CPC ..... F02D 41/2451; F02D 41/2464–247; F02D 41/2477; F02D 41/30; F02D 41/40–405; F02D 2041/224
USPC ..... 701/103–105; 73/114.43, 114.45, 114.51
See application file for complete search history.

(56) References Cited

U.S. PATENT DOCUMENTS

| | | | |
|---|---|---|---|
| 7,717,088 B2 | 5/2010 | Thomas | |
| 7,841,319 B2 | 11/2010 | Thomas | |
| 9,593,637 B2 | 3/2017 | Surnilla et al. | |
| 11,274,623 B1* | 3/2022 | Kiwan | F02D 41/3094 |
| 11,313,310 B1* | 4/2022 | Kiwan | F02D 41/20 |
| 11,319,893 B1* | 5/2022 | Pursifull | F02D 41/2467 |
| 2010/0089362 A1 | 4/2010 | Haskara et al. | |
| 2020/0116099 A1* | 4/2020 | Surnilla | F02D 41/0085 |
| 2020/0291885 A1* | 9/2020 | Pursifull | F02M 65/003 |
| 2020/0291886 A1* | 9/2020 | Pursifull | F02D 41/0085 |

OTHER PUBLICATIONS

Pursifull, R. et al., "System and Method for Injecting Fuel to an Engine," U.S. Appl. No. 16/835,654, filed Mar. 31, 2020, 39 pages.
Pursifull, R. et al., "System and Method for Injecting Fuel to an Engine," U.S. Appl. No. 17/017,791, filed Sep. 11, 2020, 33 pages.
Pursifull, R. et al., "Method and System for Adjusting Operation of a Fuel Injector," U.S. Appl. No. 17/039,589, 36 pages.

* cited by examiner

*Primary Examiner* — Robert A Werner
(74) *Attorney, Agent, or Firm* — Vincent Mastrogiacomo; McCoy Russell LLP

(57) ABSTRACT

Methods and systems are provided for balancing fuel delivery amongst all engine fuel injectors. In one example, a method may include selectively adjusting an injection timing of one or more fuel injectors of a plurality of fuel injectors to increase an inter-injection period between two consecutive fuel injections in response to a request to balance amounts of fuel injected by the plurality of fuel injectors.

20 Claims, 9 Drawing Sheets

METHOD AND SYSTEM FOR FUEL INJECTOR BALANCING

FIELD

The present description relates generally to methods and systems for calibrating fuel injectors of an engine so as to balance fuel delivery amongst all engine fuel injectors.

BACKGROUND/SUMMARY

Engines may be configured with direct fuel injectors (DI) for injecting fuel directly into an engine cylinder and/or port fuel injectors (PFI) for injecting fuel into an intake port of an engine cylinder. Fuel injectors often have piece-to-piece variability over time due to imperfect manufacturing processes and/or injector aging, for example. Over time, injector performance may degrade (e.g., injector becomes clogged) which may further increase piece-to-piece injector variability. As a result, the actual amount of fuel injected to each cylinder of an engine may not be the desired amount and the difference between the actual and desired amounts may vary between injectors. Variability in fuel injection amount between cylinders may result in reduced fuel economy, undesired tailpipe emissions, torque variation that causes a lack of perceived engine smoothness, and an overall decrease in engine efficiency. Engines operating with a dual injector system, such as dual fuel or PFDI systems, may have a higher number of fuel injectors resulting in greater possibility for injector variability. It may be desirable to balance the injectors so that all injectors have a similar error (e.g., all injectors at 1% under fueling).

Various approaches use fuel rail pressure drop across each injector to correct each injector's transfer function. One example approach is shown by Surnilla et al. in U.S. 2020/0116099. Therein, fuel rail pressure samples collected during a noisy zone of injector operation are discarded while samples collected during a quiet zone are averaged to determine an injector pressure. The injector pressure is then used to infer injection volume, injector error, and update an injector transfer function. Another example approach is shown by Surnilla et al. in U.S. Pat. No. 9,593,637. Therein, a fuel injection amount for an injector is determined based on a difference in fuel rail pressure (FRP) measured before injector firing and FRP after injector firing.

However, the inventors herein have recognized potential issues with such systems. As one example, average inter-injection pressure is used to estimate the fuel rail pressure drop across each injector even for engines with a higher number of cylinders and corresponding injection events. The inter-injection period may be based on factors such as number of cylinders, engine speed, and injection pulse width. An increase in the number of injectors may result in shorter intervals between two consecutive injection events. Shorter inter-injection periods result in errors in computation of average inter-injection pressure due to Gaussian noises. Another offset error in the estimated average inter-injection pressure may be caused by pressure oscillations due to resonance.

In one example, the issues described above may be addressed by a method for operating an engine in a vehicle, comprising: adjusting an injection timing and an amount of time between consecutive fuel injections in response to a request to balance amounts of fuel injected by a plurality of fuel injectors. In this way, injection events may be spaced unevenly to extend inter-injection periods before and after an injection pressure drop.

As one example, balancing of fuel injectors may be carried out based on a learned error between commanded injection mass and actual injection mass for each injector. The learned error between commanded injection mass and actual injection mass may be estimated based on a pressure drop after an injection event which is in turn a function of average fuel rail pressure during an inter-injection period between the injection and an immediately preceding injection and average fuel rail pressure during an inter-injection period between the injection and an immediately subsequent injection. Injectors in the engine may be divided into sets of three or four injectors in a rolling pattern. In a set of three injectors, fuel may be injected from the second injector at its original timing (second injection) while injection timing of the preceding, first injector may be advanced (first injection) and injection timing of the subsequent, third injector may be retarded (third injection). A pressure drop during the second injection event may be estimated based on an average fuel rail pressure in the time period between the advanced first injection and the second injection and an average fuel rail pressure in the time period between the second injection and the retarded third injection, and this pressure drop may then be used for injector balancing. The advanced first injection increases the inter-injection interval before the second injection while the retarded third injection increases the inter-injection interval after the second injection. Pressure drops during the first injection and the third injection may not be included for balancing of the fuel injectors. This pattern may be repeated where the injection timing of the fourth injector may be advanced (fourth injection), the injection timing of the fifth injector may be unchanged (fifth injection), the injection timing of the sixth injector may be retarded (sixth injection), and so on. Retarding fuel injection from the third injector (third injection) and advancing fuel injection by the fourth injector (fourth injection) may cause the third injection and the fourth injection to take place immediately after one another. The prolonged inter-injection period is rotated through all the injectors to get a pressure drop for each injector, thus providing the fuel rail pressure drops for each injector which may then be used for injector pressure balancing. Also, one or more intermediate injections may be skipped to increase inter-injection timing between two consecutive injections.

In this way, by retarding injection timing for an injector while advancing injection timing for another injector, inter-injection period between two consecutive injections may be increased. An increase in the inter-injection period would reduce errors in computation of average inter-injection pressure due to both Gaussian noises and pressure oscillations from resonance. The technical effect of selectively including certain injection events for balancing of the fuel injectors is that only injection events with an increased inter-injection period preceding and following the event are selected for improved balancing of each injector. By rotating the order and timing of fuel injection for each injector, injection events for each injector may be accounted for in the pressure balancing process. Overall, by improving pressure based injection balancing, fuel efficiency and emissions quality may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
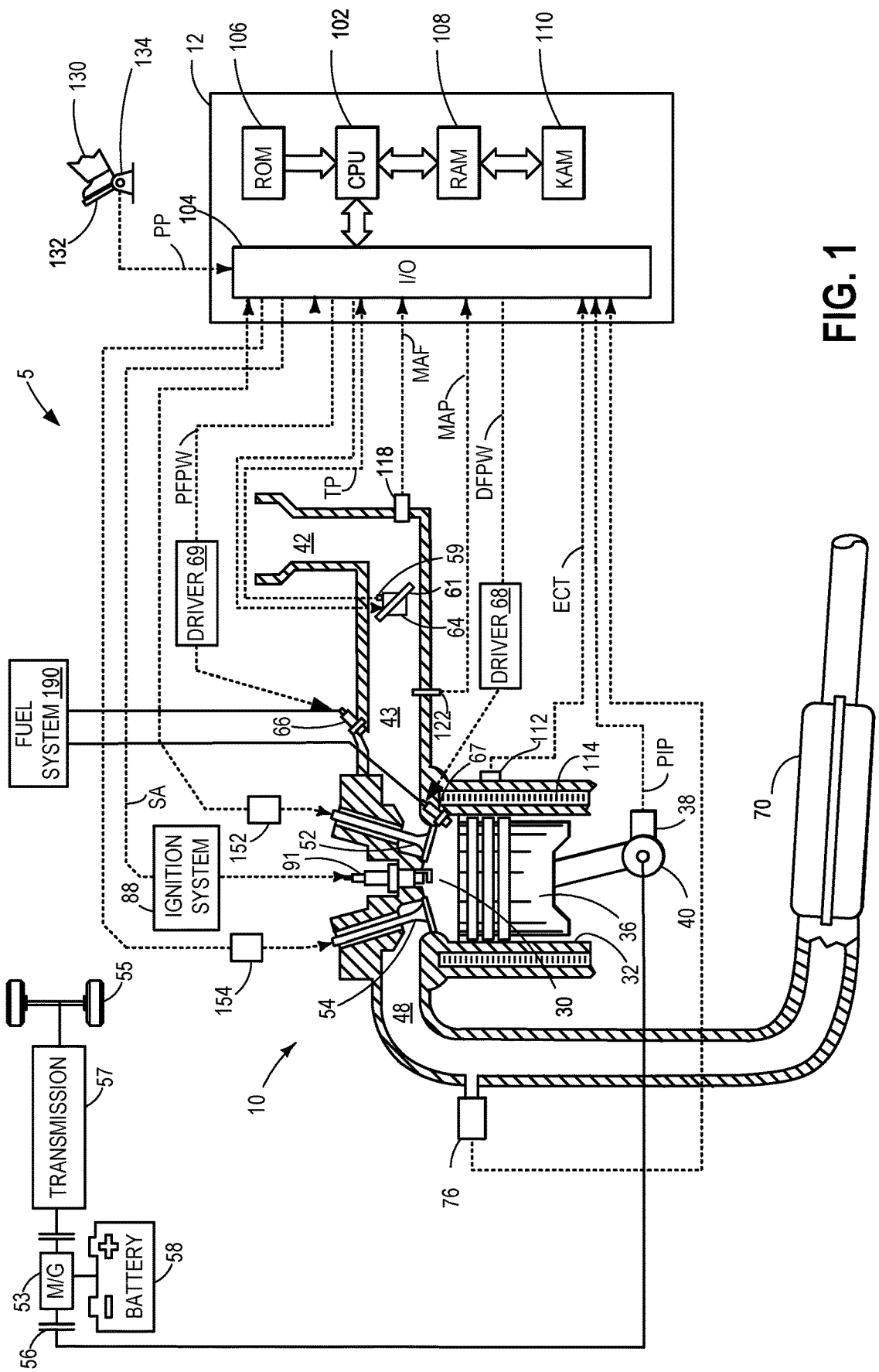
FIG. 1 shows a schematic depiction of an example propulsion system including an engine.
Figure 2:
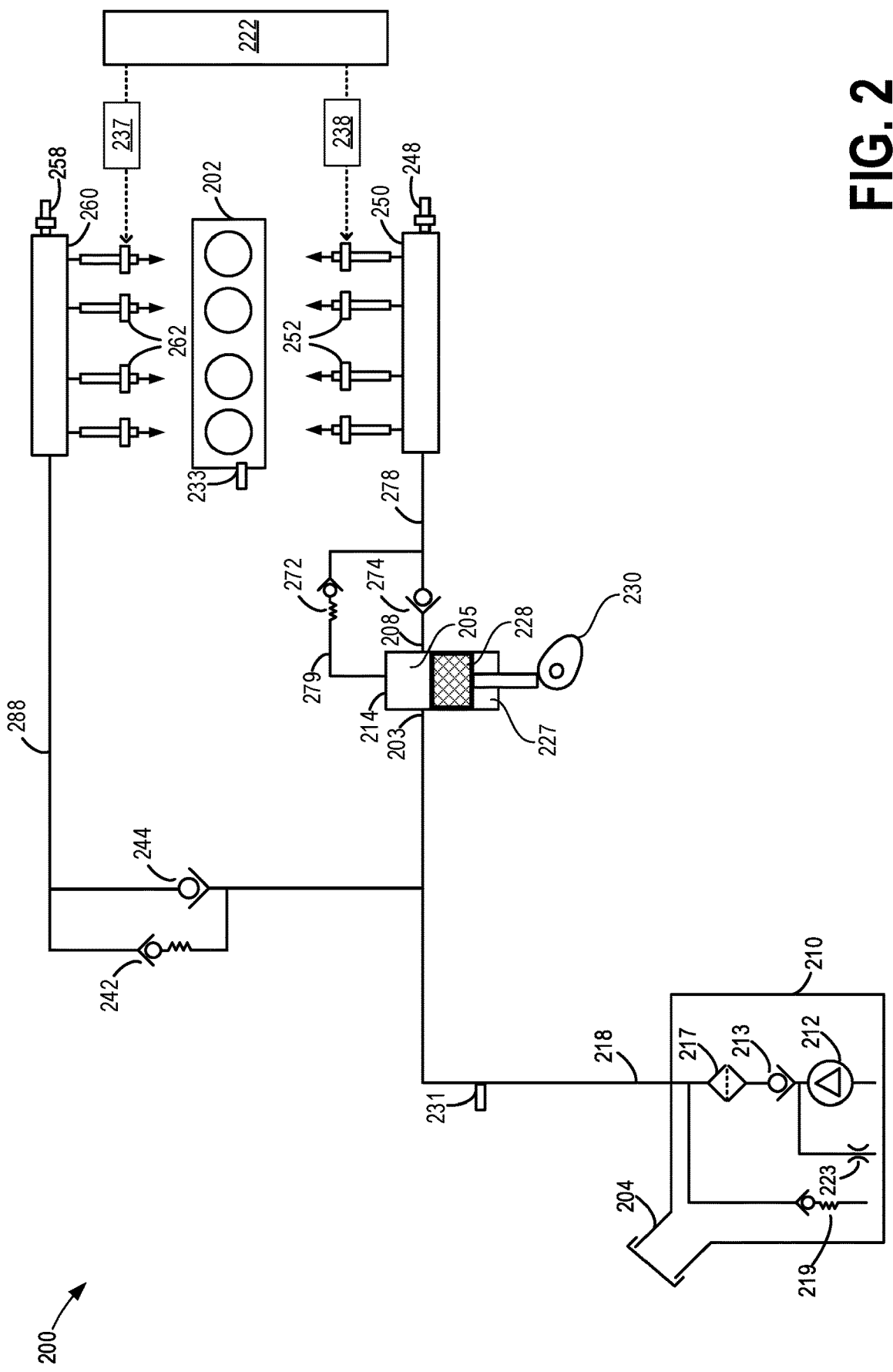
FIG. 2 shows an example fuel system coupled to the engine of FIG. 1.
Figure 8:
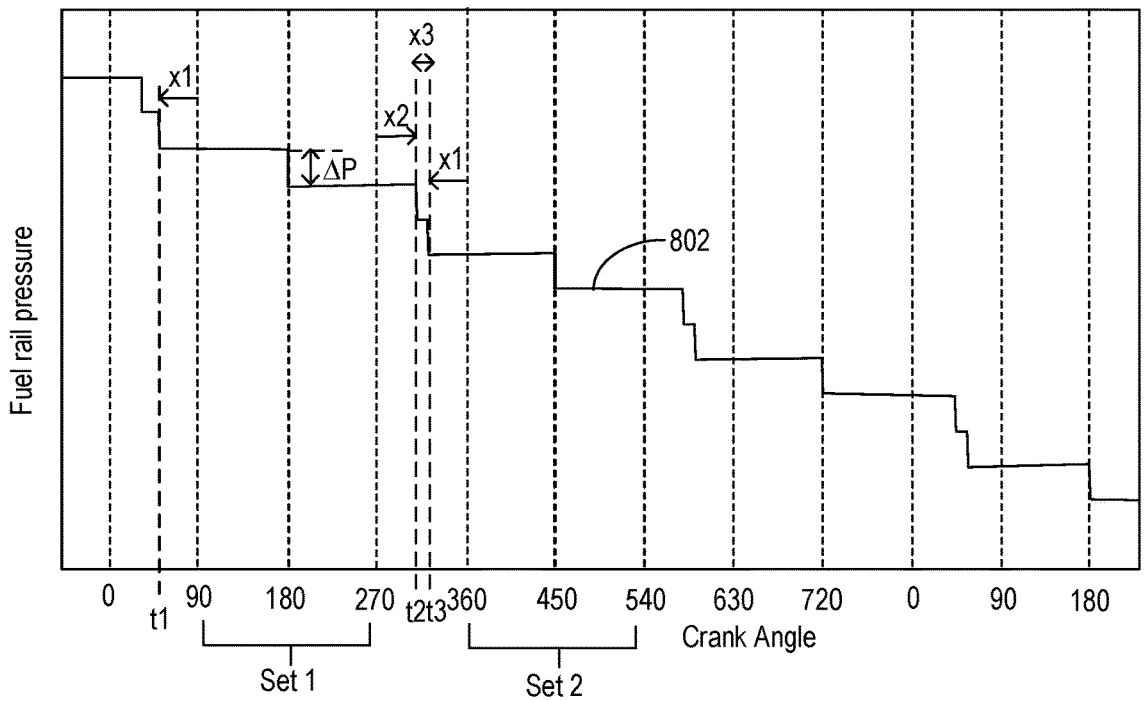
FIG. 8 shows a first plot of fuel rail pressure and crank angle for fuel injection events corresponding to the method of FIG. 4.
Figure 9:
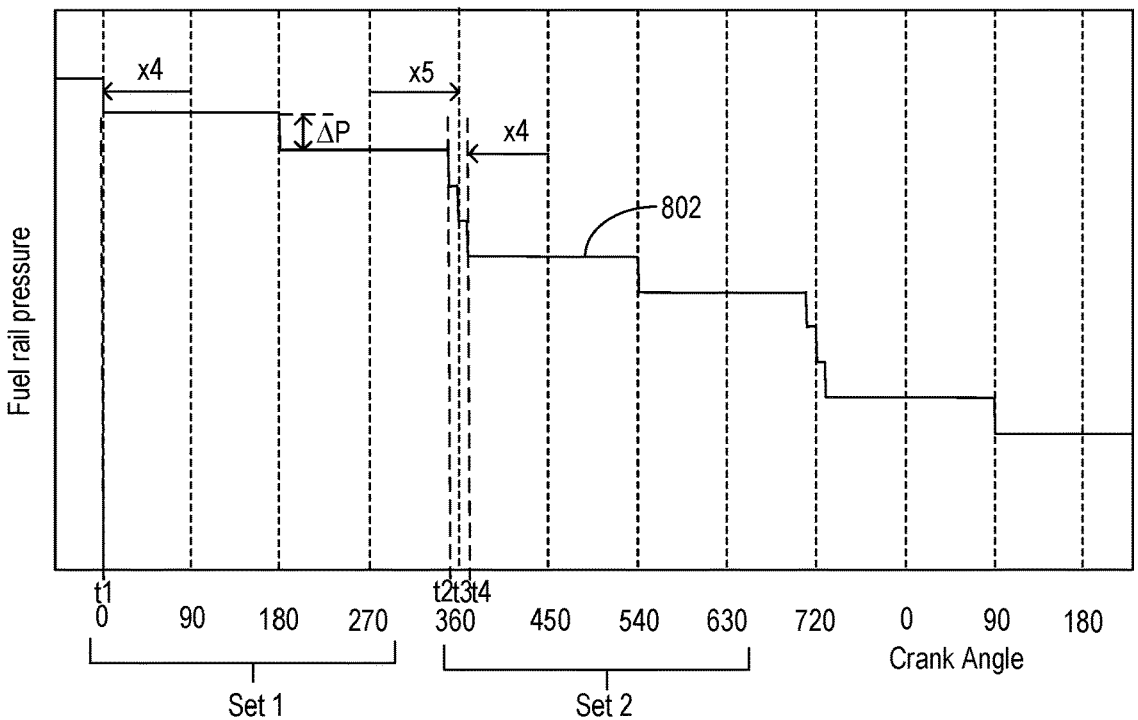
FIG. 9 shows a second plot of fuel rail pressure and crank angle for fuel injection events corresponding to the method of FIG. 5.

The following description relates to systems and methods for adjusting fuel injection timing for fuel injectors to balance fuel delivery amongst all fuel injectors such as in the fuel system of FIG. 2 coupled in the vehicle system of FIG. 1. A controller may be configured to carry out pressure based injector balancing (PBIB) for each engine injector based on the example routine of FIG. 3. Injection timing in the fuel injectors may be adjusted based on example methods shown in FIGS. 4, 5, and 10 to extend inter-injection periods before and after an injection pressure drop. Examples of uneven spacing of injection events are tabulated in FIGS. 6, 7, and 11. A plot of fuel rail pressure and crank angle for fuel injection events, as shown in FIGS. 8, 9, and 12 may be used to estimate a pressure drop following each injection event and learn individual injector errors. Injector commands are subsequently adjusted to balance injector errors.

It will be appreciated that as used herein, injector balancing does not refer to correcting injectors to an absolute standard. Instead, injector balancing as used herein refers to making the injectors inject alike based on what is learned from their resulting pressure drops during injection and the measured/predicted pressures during injection.

FIG. 1 shows a schematic depiction of a spark ignition internal combustion engine 10 with a dual injector system, where engine 10 is configured with both direct and port fuel injection. Engine 10 may be included in a vehicle 5. Engine 10 comprises a plurality of cylinders of which one cylinder 30 (also known as combustion chamber 30) is shown in FIG. 1. Cylinder 30 of engine 10 is shown including combustion chamber walls 32 with piston 36 positioned therein and connected to crankshaft 40. A starter motor (not shown) may be coupled to crankshaft 40 via a flywheel (not shown), or alternatively, direct engine starting may be used.

Combustion chamber 30 is shown communicating with intake manifold 43 and exhaust manifold 48 via intake valve 52 and exhaust valve 54, respectively. In addition, intake manifold 43 is shown with throttle 64 which adjusts a position of throttle plate 61 to control airflow from intake passage 42.

Intake valve 52 may be operated by controller 12 via actuator 152. Similarly, exhaust valve 54 may be activated by controller 12 via actuator 154. During some conditions, controller 12 may vary the signals provided to actuators 152 and 154 to control the opening and closing of the respective intake and exhaust valves. The position of intake valve 52 and exhaust valve 54 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 30 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

In another embodiment, four valves per cylinder may be used. In still another example, two intake valves and one exhaust valve per cylinder may be used.

Combustion chamber 30 can have a compression ratio, which is the ratio of volumes when piston 36 is at bottom center to top center. In one example, the compression ratio may be approximately 9:1. However, in some examples where different fuels are used, the compression ratio may be increased. For example, it may be between 10:1 and 11:1 or 11:1 and 12:1, or greater.

In some embodiments, each cylinder of engine 10 may be configured with one or more fuel injectors for providing fuel thereto. As shown in FIG. 1, cylinder 30 includes two fuel injectors, 66 and 67. Fuel injector 67 is shown directly coupled to combustion chamber 30 for delivering injected fuel directly therein in proportion to the pulse width of signal DFPW received from controller 12 via electronic driver 68. In this manner, direct fuel injector 67 provides what is known as direct injection (hereafter referred to as "DI") of fuel into combustion chamber 30. While FIG. 1 shows injector 67 as a side injector, it may also be located overhead of the piston, such as near the position of spark plug 91. Such a position may improve mixing and combustion due to the lower volatility of some alcohol based fuels. Alternatively, the injector may be located overhead and near the intake valve to improve mixing.

Fuel injector 66 is shown arranged in intake manifold 43 in a configuration that provides what is known as port injection of fuel (hereafter referred to as "PFI") into the intake port upstream of cylinder 30 rather than directly into cylinder 30. Port fuel injector 66 delivers injected fuel in proportion to the pulse width of signal PFPW received from controller 12 via electronic driver 69.

Fuel may be delivered to fuel injectors 66 and 67 by a high pressure fuel system 190 including a fuel tank, fuel pumps, and fuel rails. Further, the fuel tank and rails may each have a pressure transducer providing a signal to controller 12. In this example, both direct fuel injector 67 and port fuel injector 66 is shown. However, certain engines may include only one kind of fuel injector such as either direct fuel injector or port fuel injector. Fuel injection to each cylinder may be carried out via direct injectors (in absence of port injectors) or port direct injectors (in absence of direct injectors). An example fuel system including fuel pumps and injectors and fuel rails is elaborated on with reference to FIG. 2.

Returning to FIG. 1, exhaust gases flow through exhaust manifold 48 into emission control device 70 which can include multiple catalyst bricks, in one example. In another example, multiple emission control devices, each with multiple bricks, can be used. Emission control device 70 can be a three-way type catalyst in one example.

Exhaust gas sensor 76 is shown coupled to exhaust manifold 48 upstream of emission control device 70 (where sensor 76 can correspond to a variety of different sensors). For example, sensor 76 may be any of many known sensors for providing an indication of exhaust gas air/fuel ratio such as a linear oxygen sensor, a UEGO, a two-state oxygen sensor, an EGO, a HEGO, or an HC or CO sensor. In this particular example, sensor 76 is a two-state oxygen sensor that provides signal EGO to controller 12 which converts signal EGO into two-state signal EGOS. A high voltage state of signal EGOS indicates exhaust gases are rich of stoichiometry and a low voltage state of signal EGOS indicates exhaust gases are lean of stoichiometry. Signal EGOS may be used to advantage during feedback air/fuel control to maintain average air/fuel at stoichiometry during a stoichiometric homogeneous mode of operation. A single exhaust gas sensor may serve 1, 2, 3, 4, 5, or other number of cylinders.

Distributorless ignition system 88 provides ignition spark to combustion chamber 30 via spark plug 91 in response to spark advance signal SA from controller 12.

Controller 12 may cause combustion chamber 30 to operate in a variety of combustion modes, including a homogeneous air/fuel mode and a stratified air/fuel mode by controlling injection timing, injection amounts, spray patterns, etc. Further, combined stratified and homogenous mixtures may be formed in the chamber. In one example, stratified layers may be formed by operating injector 66 during a compression stroke. In another example, a homogenous mixture may be formed by operating one or both of injectors 66 and 67 during an intake stroke (which may be open valve injection). In yet another example, a homogenous mixture may be formed by operating one or both of injectors 66 and 67 before an intake stroke (which may be closed valve injection). In still other examples, multiple injections from one or both of injectors 66 and 67 may be used during one or more strokes (e.g., intake, compression, exhaust, etc.). Even further examples may be where different injection timings and mixture formations are used under different conditions, as described below.

Controller 12 can control the amount of fuel delivered by fuel injectors 66 and 67 so that the homogeneous, stratified, or combined homogenous/stratified air/fuel mixture in chamber 30 can be selected to be at stoichiometry, a value rich of stoichiometry, or a value lean of stoichiometry. Further, controller 12 may control the timing of fuel injection by fuel injectors 66 and 67. As an example, during pressure based balancing of the fuel injectors 66 and 67, the injection timing of one or more injectors may be selectively advanced or retarded relative to their respective original injection timings to increase the amount of time between two consecutive fuel injections.

As described above, FIG. 1 merely shows one cylinder of a multi-cylinder engine, and that each cylinder has its own set of intake/exhaust valves, fuel injectors, spark plugs, etc. Also, in the example embodiments described herein, the engine may be coupled to a starter motor (not shown) for starting the engine. The starter motor may be powered when the driver turns a key in the ignition switch on the steering column, for example. The starter is disengaged after engine start, for example, by engine 10 reaching a predetermined speed after a predetermined time. Further, in the disclosed embodiments, an exhaust gas recirculation (EGR) system may be used to route a desired portion of exhaust gas from exhaust manifold 48 to intake manifold 43 via an EGR valve (not shown). Alternatively, a portion of combustion gases may be retained in the combustion chambers by controlling exhaust valve timing.

In some examples, vehicle 5 may be a hybrid vehicle with multiple sources of torque available to one or more vehicle wheels 55. In other examples, vehicle 5 is a conventional vehicle with only an engine, or an electric vehicle with only electric machine(s). In the example shown, vehicle 5 includes engine 10 and an electric machine 53. Electric machine 53 may be a motor or a motor/generator. Crankshaft 140 of engine 10 and electric machine 53 are connected via a transmission 57 to vehicle wheels 55 when one or more clutches 56 are engaged. In the depicted example, a first clutch 56 is provided between crankshaft 140 and electric machine 53, and a second clutch 56 is provided between electric machine 53 and transmission 57. Controller 12 may send a signal to an actuator of each clutch 56 to engage or disengage the clutch, so as to connect or disconnect crankshaft 140 from electric machine 53 and the components connected thereto, and/or connect or disconnect electric machine 53 from transmission 57 and the components connected thereto. Transmission 57 may be a gearbox, a planetary gear system, or another type of transmission. The powertrain may be configured in various manners including as a parallel, a series, or a series-parallel hybrid vehicle.

Electric machine 53 receives electrical power from a traction battery 58 to provide torque to vehicle wheels 55. Electric machine 53 may also be operated as a generator to provide electrical power to charge battery 58, for example during a braking operation.

Controller 12 is shown in FIG. 1 as a conventional microcomputer including: central processing unit (CPU) 102, input/output (I/O) ports 104, read-only memory (ROM) 106, random access memory (RAM) 108, keep alive memory (KAM) 110, and a conventional data bus. Controller 12 is shown receiving various signals from sensors coupled to engine 10, in addition to those signals previously discussed, including measurement of inducted mass air flow (MAF) from mass air flow sensor 118; engine coolant temperature (ECT) from temperature sensor 112 coupled to cooling sleeve 114; a profile ignition pickup signal (PIP) from Hall effect sensor 38 coupled to crankshaft 40; and throttle position TP from throttle position sensor 59 and an absolute Manifold Pressure Signal MAP from sensor 122. Engine speed signal RPM is generated by controller 12 from signal PIP in a conventional manner and manifold pressure signal MAP from a manifold pressure sensor provides an indication of vacuum, or pressure, in the intake manifold. During stoichiometric operation, this sensor can give an indication of engine load. Further, this sensor, along with engine speed, can provide an estimate of charge (including air) inducted into the cylinder. In one example, sensor 38, which is also used as an engine speed sensor, produces a predetermined number of equally spaced pulses every revolution of the crankshaft. The controller 12 receives signals from the various sensors of FIG. 1 and employs the various actuators of FIG. 1, such as throttle 61, fuel injectors 66 and 67, spark plug 91, etc., to adjust engine operation based on the received signals and instructions stored on a memory of the controller. As one example, the controller may send a pulse width signal to the port injector and/or the direct injector to adjust a timing of fuel injection and an amount of fuel delivered to a cylinder via an injector.

FIG. 2 schematically depicts an example embodiment 200 of a fuel system, such as fuel system 190 of FIG. 1. Fuel system 200 may be operated to deliver fuel to an engine, such as engine 10 of FIG. 1. Fuel system 200 may be operated by a controller to perform some or all of the operations described with reference to the methods of FIGS. 3-5, 10.

Fuel system 200 includes a fuel storage tank 210 for storing the fuel on-board the vehicle, a lower pressure fuel pump (LPP) 212 (herein also referred to as fuel lift pump 212), and a higher pressure fuel pump (HPP) 214 (herein also referred to as fuel injection pump 214). Fuel may be provided to fuel tank 210 via fuel filling passage 204. In one example, LPP 212 may be an electrically-powered lower pressure fuel pump disposed at least partially within fuel tank 210. LPP 212 may be operated by a controller 222 (e.g., controller 12 of FIG. 1) to provide fuel to HPP 214 via fuel passage 218. LPP 212 can be configured as what may be referred to as a fuel lift pump. As one example, LPP 212 may be a turbine (e.g., centrifugal) pump including an electric (e.g., DC) pump motor, whereby the pressure increase across the pump and/or the volumetric flow rate through the pump may be controlled by varying the electrical power provided to the pump motor, thereby increasing or decreasing the motor speed. For example, as the controller reduces the electrical power that is provided to lift pump 212, the volumetric flow rate and/or pressure increase across the lift pump may be reduced. The volumetric flow rate and/or pressure increase across the pump may be increased by increasing the electrical power that is provided to lift pump 212. As one example, the electrical power supplied to the lower pressure pump motor can be obtained from an alternator or other energy storage device on-board the vehicle (not shown), whereby the control system can control the electrical load that is used to power the lower pressure pump. Thus, by varying the voltage and/or current provided to the lower pressure fuel pump, the flow rate and pressure of the fuel provided at the inlet of the higher pressure fuel pump 214 is adjusted.

LPP 212 may be fluidly coupled to a filter 217, which may remove small impurities contained in the fuel that could potentially damage fuel handling components. A check valve 213, which may facilitate fuel delivery and maintain fuel line pressure, may be positioned fluidly upstream of filter 217. With check valve 213 upstream of the filter 217, the compliance of low-pressure passage 218 may be increased since the filter may be physically large in volume. Furthermore, a pressure relief valve 219 may be employed to limit the fuel pressure in low-pressure passage 218 (e.g., the output from lift pump 212). Relief valve 219 may include a ball and spring mechanism that seats and seals at a specified pressure differential, for example. The pressure differential set-point at which relief valve 219 may be configured to open may assume various suitable values; as a non-limiting example, the set-point may be 6.4 bar or 5 bar (g). An orifice 223 may be utilized to allow for air and/or fuel vapor to bleed out of the lift pump 212. This bleed at orifice 223 may also be used to power a jet pump used to transfer fuel from one location to another within the tank 210. In one example, an orifice check valve (not shown) may be placed in series with orifice 223. In some embodiments, fuel system 8 may include one or more (e.g., a series) of check valves fluidly coupled to low-pressure fuel pump 212 to impede fuel from leaking back upstream of the valves. In this context, upstream flow refers to fuel flow traveling from fuel rails 250, 260 towards LPP 212 while downstream flow refers to the nominal fuel flow direction from the LPP towards the HPP 214 and thereon to the fuel rails.

Fuel lifted by LPP 212 may be supplied at a lower pressure into a fuel passage 218 leading to an inlet 203 of HPP 214. HPP 214 may then deliver fuel into a first fuel rail 250 coupled to one or more fuel injectors of a first group of direct injectors 252 (herein also referred to as a first injector group). Fuel lifted by the LPP 212 may also be supplied to a second fuel rail 260 coupled to one or more fuel injectors of a second group of port injectors 262 (herein also referred to as a second injector group). HPP 214 may be operated to raise the pressure of fuel delivered to the first fuel rail above the lift pump pressure, with the first fuel rail coupled to the direct injector group operating with a high pressure. As a result, high pressure DI may be enabled while PFI may be operated at a lower pressure.

While each of first fuel rail 250 and second fuel rail 260 are shown dispensing fuel to four fuel injectors of the respective injector group 252, 262, it will be appreciated that each fuel rail 250, 260 may dispense fuel to any suitable number of fuel injectors. As one example, first fuel rail 250 may dispense fuel to one fuel injector of first injector group 252 for each cylinder of the engine while second fuel rail 260 may dispense fuel to one fuel injector of second injector group 262 for each cylinder of the engine. Controller 222 can individually actuate each of the port injectors 262 via a port injection driver 237 and actuate each of the direct injectors 252 via a direct injection driver 238. The controller 222, the drivers 237, 238 and other suitable engine system controllers can comprise a control system. While the drivers 237, 238 are shown external to the controller 222, it should be appreciated that in other examples, the controller 222 can include the drivers 237, 238 or can be configured to provide the functionality of the drivers 237, 238. Controller 222 may include additional components not shown, such as those included in controller 12 of FIG. 1.

HPP 214 may be an engine-driven, positive-displacement pump. As one non-limiting example, HPP 214 may be a Bosch HDP5 high pressure pump, which utilizes a solenoid activated control valve (e.g., fuel volume regulator, magnetic solenoid valve, etc.) to vary the effective pump volume of each pump stroke. The outlet check valve of HPP is mechanically controlled and not electronically controlled by an external controller. HPP 214 may be mechanically driven by the engine in contrast to the motor driven LPP 212. HPP 214 includes a pump piston 228, a pump compression chamber 205 (herein also referred to as compression chamber), and a step-room 227. Pump piston 228 receives a mechanical input from the engine crank shaft or cam shaft via cam 230, thereby operating the HPP according to the principle of a cam-driven single-cylinder pump. A sensor (not shown in FIG. 2) may be positioned near cam 230 to enable determination of the angular position of the cam (e.g., between 0 and 360 degrees), which may be relayed to controller 222. On a three or six-cylinder engine with a DI pump driven with a 3 lobe cam, a 240°, 480°, or 720° averaging period would be appropriate. On a 4 or 8-cylinder engine with a DI pump driven by a 4 lobe cam, a 180°, 360°, 540°, or 720° averaging period would be appropriate because each would contain a given number of pressure rises due to pump strokes and pressure drops due to injection events.

Based on the configuration of the engine as well as the configuration of the HPP (such as the number and position of cam lobes), the HPP may apply a repeating pattern onto the fuel rail pressure. For example, an 8 cylinder engine with a 3 lobe pump repeats its FRP pattern every 720°. As another example, an 8 cylinder engine with a 4 lobe pump repeats its FRP pattern every 180°. A 6 cylinder engine with a 3 lobe pump repeats its pattern every 240°. A 6 cylinder engine with a 4 lobe pump repeats its FRP pattern every 720°.

A lift pump fuel pressure sensor 231 may be positioned along fuel passage 218 between lift pump 212 and higher pressure fuel pump 214. In this configuration, readings from sensor 231 may be interpreted as indications of the fuel pressure of lift pump 212 (e.g., the outlet fuel pressure of the lift pump) and/or of the inlet pressure of higher pressure fuel pump. Readings from sensor 231 may be used to assess the operation of various components in fuel system 200, to determine whether sufficient fuel pressure is provided to higher pressure fuel pump 214 so that the higher pressure fuel pump ingests liquid fuel and not fuel vapor, and/or to minimize the average electrical power supplied to lift pump 212.

First fuel rail 250 includes a first fuel rail pressure sensor 248 for providing an indication of direct injection fuel rail pressure to the controller 222. Likewise, second fuel rail 260 includes a second fuel rail pressure sensor 258 for providing an indication of port injection fuel rail pressure to the controller 222. An engine speed sensor 233 (or an engine angular position sensor from which speed is deduced) can be used to provide an indication of engine speed to the controller 222. The indication of engine speed can be used to identify the speed of higher pressure fuel pump 214, since the pump 214 is mechanically driven by the engine 202, for example, via the crankshaft or camshaft. A solenoid controlled valve (not shown) may be included on the inlet side of pump 214. This solenoid controlled valve may have two positions, a first pass through position and a second checked position. In the pass through position, no net pumping into the fuel rail 250 occurs. In the checked position, pumping occurs on the compression stroke of plunger/piston 228. This solenoid valve is synchronously controlled with its drive cam to modulate the fuel quantity pumped into fuel rail 260.

First fuel rail 250 is coupled to an outlet 208 of HPP 214 along fuel passage 278. A check valve 274 and a pressure relief valve (also known as pump relief valve) 272 may be positioned between the outlet 208 of the HPP 214 and the first (DI) fuel rail 250. The pump relief valve 272 may be coupled to a bypass passage 279 of the fuel passage 278. Outlet check valve 274 opens to allow fuel to flow from the high pressure pump outlet 208 into a fuel rail only when a pressure at the outlet of direct injection fuel pump 214 (e.g., a compression chamber outlet pressure) is higher than the fuel rail pressure. The pump relief valve 272 may limit the pressure in fuel passage 278, downstream of HPP 214 and upstream of first fuel rail 250. For example, pump relief valve 272 may limit the pressure in fuel passage 278 to 200 bar. Pump relief valve 272 allows fuel flow out of the DI fuel rail 250 toward pump outlet 208 when the fuel rail pressure is greater than a predetermined pressure. Valves 244 and 242 work in conjunction to keep the low pressure fuel rail 260 pressurized to a pre-determined low pressure. Pressure relief valve 242 helps limit the pressure that can build in fuel rail 260 due to thermal expansion of fuel.

Based on engine operating conditions, fuel may be delivered by one or more port injectors 262 and direct injectors 252. For example, during high load conditions, fuel may be delivered to a cylinder on a given engine cycle via only direct injection, wherein port injectors 262 are disabled. In another example, during mid-load conditions, fuel may be delivered to a cylinder on a given engine cycle via each of direct and port injection. As still another example, during low load conditions, engine starts, as well as warm idling conditions, fuel may be delivered to a cylinder on a given engine cycle via only port injection, wherein direct injectors 252 are disabled.

It is noted here that the high pressure pump 214 of FIG. 2 is presented as an illustrative example of one possible configuration for a high pressure pump. Components shown in FIG. 2 may be removed and/or changed while additional components not presently shown may be added to pump 214 while still maintaining the ability to deliver high-pressure fuel to a direct injection fuel rail and a port injection fuel rail.

Controller 12 can also control the operation of each of fuel pumps 212, and 214 to adjust an amount, pressure, flow rate, etc., of a fuel delivered to the engine. As one example, controller 12 can vary a pressure setting, a pump stroke amount, a pump duty cycle command, and/or fuel flow rate of the fuel pumps to deliver fuel to different locations of the fuel system. A driver (not shown) electronically coupled to controller 222 may be used to send a control signal to the low pressure pump, as required, to adjust the output (e.g., speed, flow output, and/or pressure) of the low pressure pump.

The fuel injectors may have injector-to-injector variability due to manufacturing, as well as due to age. Ideally, for improved fuel economy, injector balancing is desired wherein every cylinder has matching fuel injection amounts for matching fuel delivery commands. By balancing air and fuel injection into all cylinders, engine performance is improved. In particular, fuel injection balancing improves exhaust emission control via effects on exhaust catalyst operation. In addition, fuel injection balancing improves fuel economy because fueling richer or leaner than desired reduces fuel economy and results in an inappropriate ignition timing for the actual fuel-air ratio (relative to the desired ratio). Thus, getting to the intended relative fuel-air ratio has both a primary and secondary effect on maximizing the cylinder energy for the fuel investment.

Fueling errors can have various causes in addition to injector-to-injector variability. These include cylinder-to-cylinder maldistribution, shot-to-shot variation, and transient effects. In the case of injector-to-injector variability, each injector has a different error between what is commanded to be dispensed and what is actually dispensed. As such, fuel injector balancing may result in an engine's torque evenness. Air and fuel evenness improves emission control.

During balancing of the amount of fuel injected by a plurality of fuel injectors, a first fuel mass error of a second fuel injector may be estimated based on each of an estimated average fuel rail pressure during an inter-injection period between fuel injection by a first fuel injector and fuel injection by the second fuel injector and an estimated average fuel rail pressure during another inter-injection period between the fuel injection by the second fuel injector and fuel injection by a third fuel injector. Subsequent engine fueling may be adjusted based on the learned first fuel mass error.

The injection timing of the first fuel injection may be advanced relative to its original injection timing while the injection timing of the immediately subsequent, second fuel injection may not be adjusted from its original injection timing to increase the amount of time between the first fuel injection and the second fuel injection. Also, the injection timing of the third fuel injection may be retarded relative to its original injection timing to increase the amount of time between the second fuel injection and the third fuel injection. The respective original injection timing for each fuel injector may be based on a configuration of the high pressure pump 214 and a number of cylinders in the engine. A first amount of time between the first fuel injection and the immediately subsequent, second fuel injection may be longer than an original amount of time by a first duration, the original amount of time based on the configuration of the high pressure pump 214 and the number of cylinders in the engine. The first duration may be equal to a number of crank angles by which the first fuel injection is advanced from its original injection timing. The number of crank angles by which the first fuel injection is advanced may be half of the original amount of time. As an example, if the original amount of time is 90° crank angle, the first fuel injection may be advanced by 45° crank angle. Also, if the first fuel injection is advanced by 90° crank angle, the first duration may be 90° crank angle.

Said another way, the injection timing of two injections may be adjusted to increase the inter-injection period before and after a given injection. As an example, for three injections, the first injection may be advanced, the second injection may be carried out without adjusting injection timing, and the third injection may be retarded. This lengthens the inter-injection periods surrounding a given injection. Thus, the pressure drop associated with the given injection is based on longer duration inter-injection period than would be the case if injections were evenly spaced.

During balancing of the amount of fuel injected, one or more fuel injections from the one or more fuel injectors with adjusted injection timings may be excluded from estimation of the average injector fuel mass error. In order to balance the fuel injectors, an average injector fuel mass error may be estimated based on a fuel mass error for each fuel injector, and a transfer function may be updated for each fuel injector based on the average injector fuel mass error to provide a common error for each fuel injector.

In this way, the systems of FIGS. 1 and 2 provide for a controller with computer-readable instructions stored on non-transitory memory that when executed cause the controller to: during balancing amounts of fuel injected by a plurality of fuel injectors coupled to a fuel rail of a fuel system, inject fuel to injectors from alternate fuel injectors of a first set of injectors, skipping one or more intermediate injections between two injections from the first set of injectors, estimate injector fuel mass error for a first injector of the first set of injectors injecting fuel based on an average pressure of the fuel rail during each of a first inter-injection period between a first injection from the first injector and an immediately previous injection and a second inter-injection period between the first injection and an immediately subsequent injection. During skipping one or more intermediate injections between two injections from the first set of injectors, fuel may be injected to each cylinder not receiving fuel from the first set of injectors via a second set of fuel injectors. Said another way, having two ways of fueling cylinders (PFI and DI) allows skipping injections and thus lengthening the inter-injection period.

Figure 3:
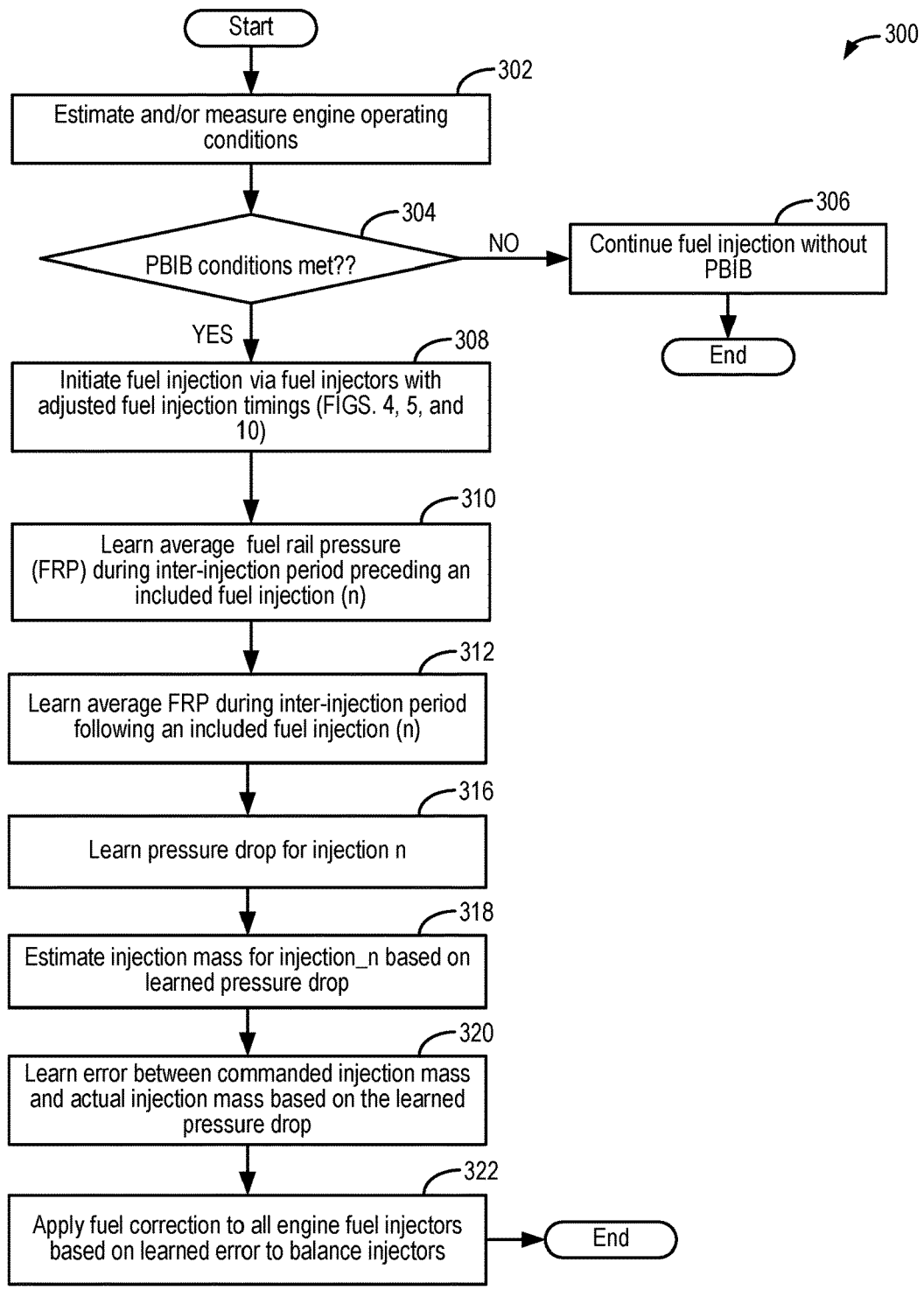
FIG. 3 shows a flow-chart of a first example method for carrying out pressure based injector balancing for the engine fuel injectors.

Turning now to FIG. 3, an example method for carrying out pressure based injector balancing for the engine fuel injectors is shown at 300. The method enables the injection volume dispensed by the fuel injector on the given fuel injection event to be accurately determined and used for balancing injector errors. Instructions for carrying out method 300 may be executed by a controller based on instructions stored on a memory of the controller and in conjunction with signals received from sensors of the engine system, such as the sensors described above with reference to FIGS. 1-2. The controller may employ engine actuators of the engine system to adjust engine operation, according to the methods described below.

At 302, the method includes estimating and/or measuring engine operating conditions. These include, for example, engine speed, torque demand, manifold pressure, manifold air flow, ambient conditions (ambient temperature, pressure, and humidity, for example), engine dilution, etc.

At 304, the routine includes determining if pressure based injector balancing (PBIB) conditions are met for the engine fuel injectors (such as direct injectors 252 or port fuel injectors 262 in FIG. 2). PBIB learning may be performed to learn a variation in injector errors. As such, each injector may have an error between the commanded fuel mass to be delivered and the actual fuel mass that was delivered. By learning individual injector errors, the errors may be balanced so that all injectors move towards a common error value. PBIB learning may be performed at selected conditions such as when engine speed is lower than a threshold speed, while injector pulse-width is lower than a threshold, and when multiple injectors are not scheduled to deliver concurrently. At high engine speeds or large fuel pulse-widths the DI injection periods can overlap, thus substantially eliminating any inter-injection period. When multiple injectors are on simultaneously, an inter-injection period ceases to exists, also disabling any PBIB learning from being performed. If PBIB conditions are not confirmed, then at 306, the method includes continuing fuel injection via each injector without performing PBIB at this time.

Figure 4:
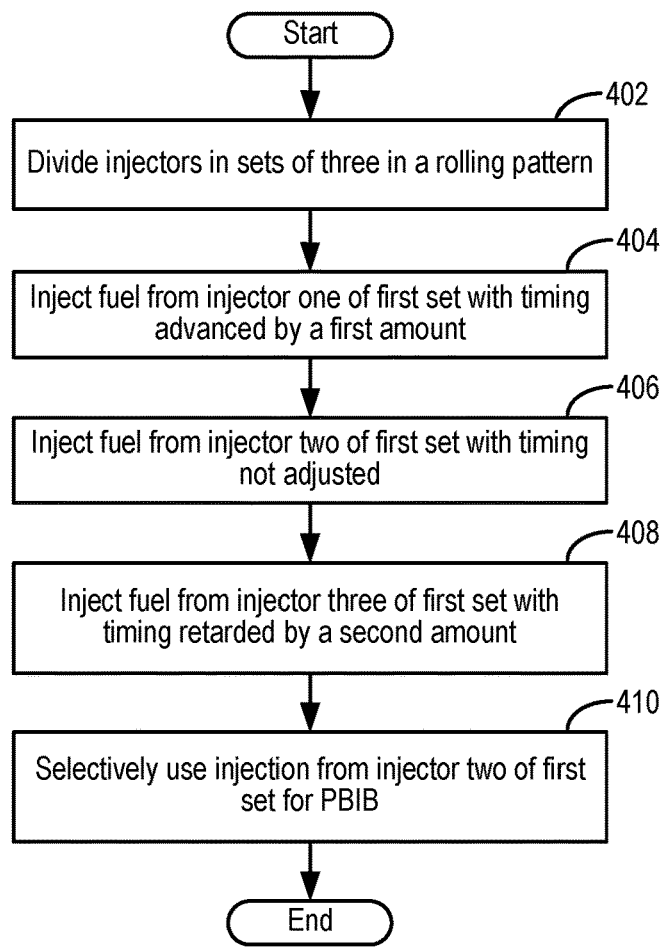
FIG. 4 shows a first example method for adjusting injection timing in fuel injectors.
Figure 5:
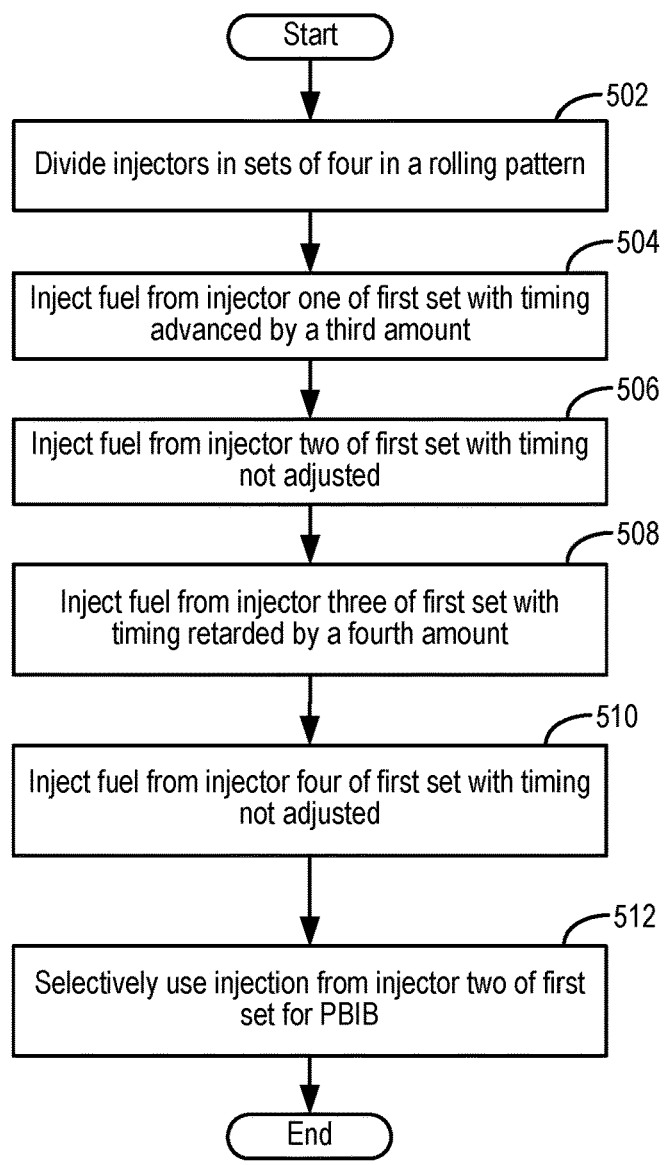
FIG. 5 shows a second example method for adjusting injection timing in fuel injectors.
Figure 10:
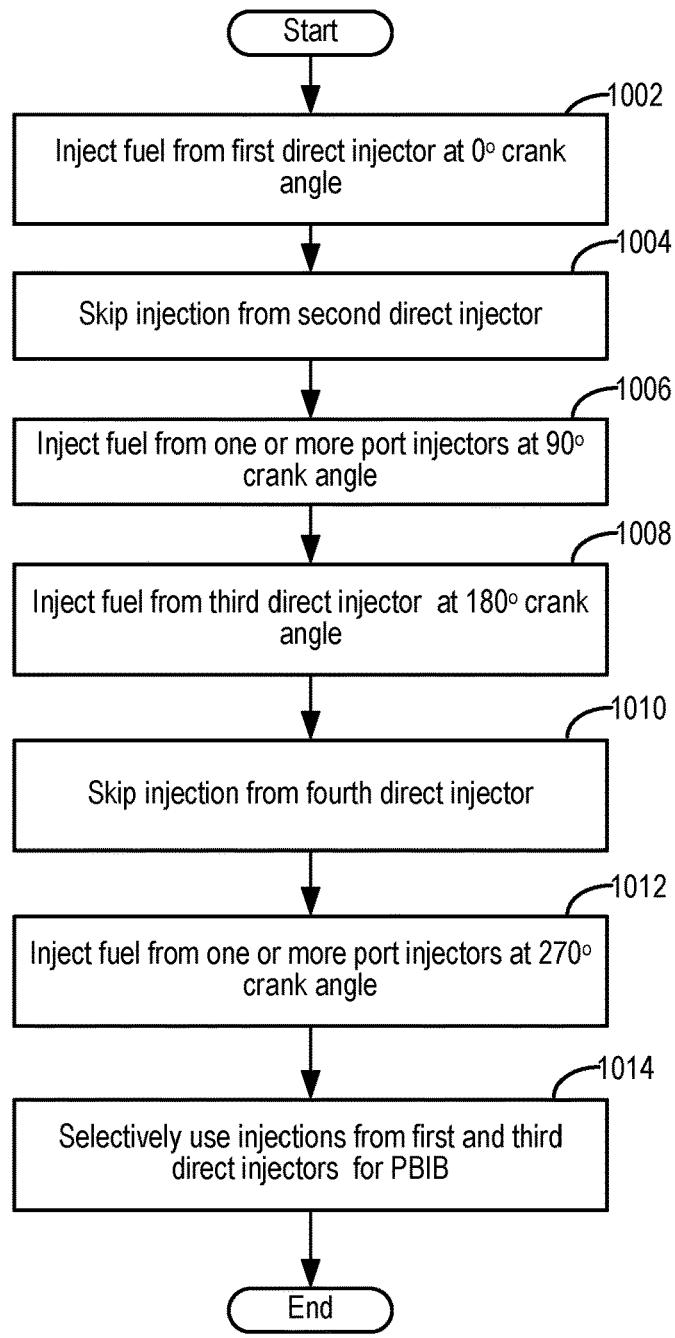
FIG. 10 shows a third example method for adjusting injection timing in fuel injectors.

If conditions are met for carrying out PBIB, at 308, fuel injection via the engine fuel injectors is initiated with adjusted injection timings. For example, in a V8 engine with a 3 lobe pump (such as HPP 214 with 3 different lobes 230), direct injection may be carried out at intervals of 90° crank angle. The direct injectors may put eight evenly spaced pressure drops onto the fuel rail pressure (over 720° CAD) for DI fuel rail. This pattern of fuel injection may be repeated on a 720° cycle. Fuel pressure during a period between two successive injection events may be used for PBIB. However, a shorter inter-injection period (such as 90° in this case) may result in error in PBIB. Therefore, in order to carry out PBIB, fuel injection via the direct injectors and/or the port injectors may be unevenly spaced to increase an inter-injection time period. Further, upon adjustments of injection timing for the injectors, certain injection events may be included in the PBIB calculations. Details of fuel injection timing adjustment and selective inclusion of injection events in PBIB is shown in FIGS. 4, 5, and 10.

At 310, a first average fuel rail pressure (FRP) may be learned during a first inter-injection period between two consecutive injections. The two consecutive injections (referred herein as first injection and second injection) may include a second injection selected to be included in the PBIB calculation and a first injection immediately preceding the second injection. As an example, in a V8 engine, as described previously, in absence of adjustment of injection timings, the difference between any two consecutive injections would be 90°. However, due to the adjustments in injection timing (as described in FIG. 4, 5), the difference between two consecutive injections may be increased to 135° or 180°. FRP may be continually sampled at the defined sampling rate during this period (135° or 180°) between two consecutive injections and averaged over the inter-injection period. An increased inter-injection period may increase the accuracy of the estimated first average FRP over the first inter-injection period.

At 312, a second average fuel rail pressure (FRP) may be learned during a second inter-injection period between two consecutive injections. The two consecutive injections (referred herein as second injection and third injection) may include the second injection selected to be included in the PBIB calculation and a third injection immediately following the second injection. As an example, in a V8 engine, as described previously, in absence of adjustment of injection timings, the difference between any two consecutive injections would be 90°. However, due to the adjustments in injection timing (as described in FIG. 4, 5), the difference between two consecutive injections may be increased to 135° or 180°. FRP may be continually sampled at the defined sampling rate during this period (135° or 180°) between two consecutive injections and averaged over the inter-injection period. An increased inter-injection period may increase the accuracy of the estimated second average FRP over the second inter-injection period. The fuel rail pressure may be sampled at a defined sampling rate, such as 1 sample every 1 millisecond. The fuel rail pressure sampled may include a port injection fuel rail pressure when the injection event is a port injection event, or a direct injection fuel rail pressure when the injection event is a direct injection event. In one example, fuel rail pressure is sampled at a 1 kHz frequency. For example, the fuel rail pressure may be sampled at a data rate of once every 1 millisecond period (that is, a 1 millisecond period) and digital resolution of 12 bit pressure sample. In still other examples, the fuel rail pressure may be sampled at a high speed, such as a 10 kHz (that is, a 0.1 millisecond period) and higher digital resolution (e.g. 14 bit pressure sample), however the higher sampling rate may not be economical. As a result of the sampling, a plurality of pressure samples are collected for each injection event from each injector.

At 316, the method includes learning a pressure drop for the selected injection event (n) after it is completed. This may include comparing a first average FRP estimated during the first inter-injection period immediately before the firing of the second injector with a second average FRP estimated during an inter-injection period immediately after the firing at the second injector.

At 318, the actual fuel mass injected at the selected injection event n based on the learned pressure drop (DeltaP) may be estimated. In one example, a map correlating pressure drop with injection mass may be used for estimating the dispensed fuel mass. In one example, there may a linear relation between drop in fuel rail pressure over an injection event and the fuel mass dispensed by an injector during that injection event. In other examples, a model, transfer function, look-up table, or algorithm may be used to learn the dispensed fuel mass based on the pressure drop. The actual mass injected is further based on the bulk modulus of the fuel, the fuel density, and the fuel rail volume. In one example, the actual mass injected is determined as per equation (1):

$$\text{Actual mass injected} = (\text{DeltaP}/\text{bulk modulus}) * \text{fuel rail volume} * \text{fuel density} \qquad (1)$$

At 320, an injector error between an intended injection mass that was commanded (based on the commanded duty cycle pulse width and average FRP at the time of the injection event) and the actual injection mass as computed from the pressure difference may be estimated. The computed difference in fuel mass is the injector error that is desired to be compensated for future injections (to balance injectors). Specifically, a fuel mass error for a given injector used to dispense fuel at the selected injection event n is computed as a difference between the commanded fuel mass (determined based on commanded pulse-width) and the actual fuel mass (determined based on the measured pressure difference). The fuel mass error for the given injector is then compared to the corresponding fuel mass error for other cylinders, or an average fuel mass error for all engine cylinder injectors. For example, the fuel mass error for a first port or direct fuel injector via which fuel is dispensed into a first cylinder during injection_n is compared to a fuel mass error for corresponding port or direct fuel injectors via which fuel is dispensed into each of the remaining engine cylinders over one or more engine cycles (where each cylinder is fueled once over the cycle). Based on the differences in fuel mass error between the injectors, a degree of balancing required between injectors is determined. The corrections across all injectors are computed, averaged, and then the average is subtracted from the individual injector corrections to learn the remaining injector-to-injector corrections needed to balance the injectors without affecting the average fueling across the cylinders. In this way, the relative errors between fuel injectors are learned and corrected.

At 322, the method includes applying a fuel correction to at least the fuel injector that dispensed fuel on injection event n based on the learned error to balance errors between injectors. More particularly, a fuel correction is applied to all engine fuel injectors so that all injectors have a common average error. For example, a transfer function of each fuel injector may be updated based on the learned fuel mass error for each injector and an average fuel injector error to reduce the variability in fuel mass injected by each injector for a given pulse width command. The controller may learn a fuel mass error of a given fuel injector based on a sensed change in fuel rail pressure after commanding the pulse-width, and adjust a transfer function of the fuel injector during a subsequent fueling event to bring the learned fuel mass error towards a common fuel mass error across all engine fuel injectors.

In one example, if the controller commanded an injection of 8.000 mg to injector_n and from the pressure drop following the injection event at injector_n, an actual injection mass of 8.200 mg was determined, then the controller may learn that the given fuel injector over-fueled by 0.200 mg. To balance the errors for all injectors, a similar error is determined for each injector and averaged. The 0.200 mg error of injector_n is compared to the average error. For example, if the average error is computed to be 0.180 mg, then the fueling of each injector is adjusted to bring the injector error (for each injector of the engine) to the average error. In this case, the command to injector_n is adjusted to account for a 0.020 mg surplus. As such, adjusting the injector error to balance the injectors may be different from adjusting the error to correct for it. To correct for the error, the injector command would have been adjusted to account for a 0.200 mg surplus.

FIG. 4 shows a first example method 400 for adjusting injection timing in fuel injectors during PBIB. In this example, the engine is an eight-cylinder engine with eight corresponding direct and/or port fuel injectors. The following method may be carried out for direct injectors or port injectors. Direct injection or port injection may be carried out at evenly spaced intervals of 90° crank angle. The regular injection interval is given by 720° divided by the number of injectors. This pattern of fuel injection may be repeated on a 720° cycle. However, in order to prolong inter-injection periods for improved estimations of average inter-injection pressure, the injection timings may be adjusted and the two consecutive injections may no longer be spaced 90° apart.

At 402, the fuel injectors in the engine may be divided in sets of three in a rolling pattern. As an example, the second, third, and fourth injectors are in set 1, fifth, sixth, and seventh injectors are in set 2, eighth, first, and second injectors are in set 3, third, fourth, and fifth injectors are in set 4, and so on. In this way, each set includes an injector one, an injector two, and an injector three.

At 404, fuel may be injected from an injector one of the first set of injectors with timing advanced by a first amount relative to the original injection timing of the injector one. In one example, the first amount may be given by 360° divided by the number of engine cylinders. In an engine with eight engines, the first amount may be 45° crank angle. If the original injection timing for that injector is 90°, the fuel may be injected at an adjusted timing of 45°. The amount of advancement may be almost half of a regular injection interval (such as 90° in this example). The controller may send a signal to an actuator of the injector one of the first set of injectors to inject an amount of fuel to the corresponding cylinder. The amount of fuel injected may be based on engine operating conditions such as engine speed, engine load engine temperature, etc. The amount of fuel injected at the advanced time may be the same amount of fuel that would have been injected if the injection timing was not advanced.

At 406, fuel may be injected from an injector two of the first set of injectors with timing not adjusted relative to the original injection timing of the injector two. If the original injection timing for that injector is 180°, the fuel may be injected at the original timing of 180°. The controller may send a signal to an actuator of the injector two of the first set of injectors to inject an amount of fuel to the corresponding cylinder at the original time.

At 408, fuel may be injected from an injector three of the first set of injectors with timing retarded by a second amount relative to the original injection timing of the injector three. In one example, the second amount may be given by 360° divided by the number of engine cylinders. In an engine with eight engines, the second amount may be equal to the first amount of 45° crank angle. If the original injection timing for that injector is 270°, the fuel may be injected at an adjusted timing of 315°. The amount of retardation may be almost half of a regular injection interval (such as 90° in this example). The controller may send a signal to an actuator of the injector three of the first set of injectors to inject an amount of fuel to the corresponding cylinder at the retarded time. The amount of fuel injected at the retarded time may be the same amount of fuel that would have been injected if the injection timing was not retarded.

After injection from injector three of the first set of injectors, the cycle of injection with adjusted injection timings may be continued to the second set of injectors. Fuel may be injected from injector one of the second set of injectors at with timing advanced by 45° crank angle relative to the original injection timing of the injector one. If the original injection timing for that injector is 360°, the fuel may be injected at an adjusted timing of 315°. In this way, by retarding the injection timing for the injector three of the first set of injectors and by advancing the injection timing for injector one of the second set of injectors, both the injector three of first set and injector one of second set may dispense fuel to respective cylinders at approximately the same time of 315°. If due to limitations in hardware, the two injections may not be possible at the exact same time, the injections may be scheduled as close to each other as possible.

At 410, fuel injection from injector two of the first set (and each set thereafter) may be included in the PBIB as described in FIG. 3. As an example, the injection from injector two may be the injection_n and the pressure drop after completion of the injection from injector two may be used to learn an error between commanded injection mass and actual injection mass, which may then be used to balance the injectors. The period between injections from injector one and injector two may be used as the preceding inter-injection period for sampling fuel rail pressure. The period between injections from injector two and injector three may be used as the subsequent inter-injection period for sampling fuel rail pressure. By advancing injection from the injector one by 45° crank angle relative to the original injection timing of the injector one, the inter-injection period between consecutive injections by injector one and injector two may be spaced apart by a 135° crank angle (instead of 90°) which is an increase of 1.5 times. By retarding injection from the injector three by 45° crank angle relative to the original injection timing of injector three, the inter-injection period between consecutive injections by injector two and injector three may be spaced apart by a 135° crank angle (instead of 90°) which is an increase of 1.5 times. By sampling fuel rail pressure over the elongated inter-injection periods preceding and following, accuracy of estimation of pressure drop after completion of the injection from injector two may be improved.

FIG. 8 shows a first plot 800 of change in fuel rail pressure and crank angle for fuel injection events corresponding to the method of FIG. 4. The x-axis denotes crank angle in degrees and the y-axis denotes fuel rail pressure. In this example, the original fuel injection interval is 90° crank angle over a cycle of 720° crank angle. The eight cylinders are grouped in sets of three in a rotating manner. As an example, the second, third, and fourth injectors are grouped as set 1, the fifth, sixth, and seventh injectors are grouped as set 2.

The first injection from injector one of the first set may be at time t1, advanced by time x1 from the originally scheduled time of 90° crank angle. Time t1 may correspond to 45° crank angle. The second injection from the injector two may be carried out at the originally scheduled time of 180° crank angle. The third injection from the injector three may be at time t2, retarded by time x2 from the originally scheduled time of 270° crank angle. Time t2 may substantially correspond to 315° crank angle. The fourth injection from injector one of the second set may be at time t3, advanced by time x1 from the originally scheduled time of 360° crank angle. Time t3 may substantially correspond to 315° crank angle. Time x1 and x2 may be almost 45°, causing both the third injection and fourth injection to occur at almost 315°. However, due to limitations in hardware, the third injection and the fourth injection may not be carried out at the exact same time and there may be a time difference of x3 between the third and fourth injections (difference between time t2 and t3). For PBIB, as described in relation to FIG. 3, injection from injector two (second injection) in the first set may be considered. The preceding inter-injection period may be the time period between time t1 and 180° crank angle. The following inter-injection period may be the time period between time 180° crank angle and t2. The drop in pressure due to a single injection is shown by ΔP.

Figure 6:
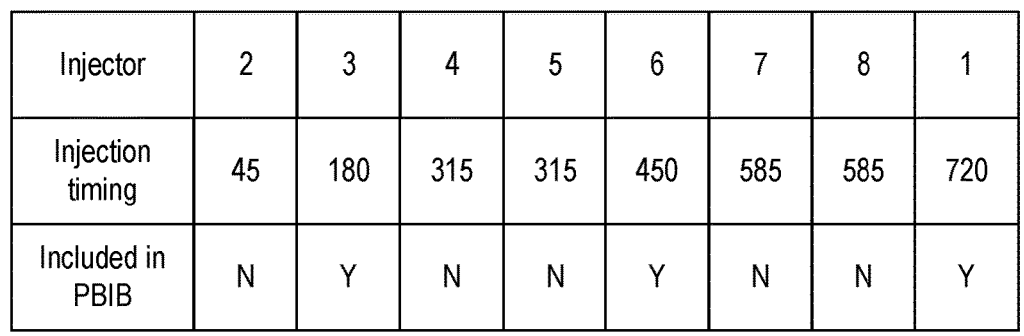
FIG. 6 is a first table of injection timings for fuel injection events corresponding to the method of FIG. 4.

FIG. 6 shows is a first table 600 of injection timings for fuel injection events corresponding to the method of FIG. 4. The first row 602 shows each injector in an eight injector engine. The second row 604 shows injection timing for each injector. The third row 606 shows if an injection from an injector is included in PBIB calculations as described in FIG. 3. The eight cylinders are grouped in sets of three in a rotating manner.

The second, third, and fourth injectors may form a first set, the fifth, sixth, and seventh injectors may form a second set, and the eighth, first, and second injectors may form a third set. The second injector (injector one of first set) dispenses fuel at 45° crank angle advanced by 45° from its original timing, the third injector (injector two of first set) dispenses fuel at 180° crank angle without adjustments to its original timing, the fourth injector (injector three of first set) dispenses fuel at 315° crank angle retarded by 45° from its original timing, the fifth injector (injector one of second set) dispenses fuel at 315° crank angle advanced by 45° from its original timing, the sixth injector (injector two of second set) dispenses fuel at 450° crank angle without adjustments to its original timing, the seventh injector (injector three of second set) dispenses fuel at 585° crank angle retarded by 45° from its original timing, the eighth injector (injector one of third set) dispenses fuel at 585° crank angle advanced by 45° from its original timing, and the first injector (injector two of third set) dispenses fuel at 720° crank angle without adjustments to its original timing.

The injectors for which injection timing is not adjusted may be included in the PBIB calculations. As an example, the third injector (injector two of first set), the sixth injector (injector two of second set), and the first injector (injector two of third set) may be first included in the PBIB calculations. As the injector are divided into groups in a cyclic manner, each injector will be subjected to a condition when the injection timing of the injector is not adjusted and the injector may then be included in the PBIB calculations. In this way, by grouping injectors in a rotating manner, each injector may be included in the PBIB calculations.

FIG. 5 shows a second example method 500 for adjusting injection timing in fuel injectors during PBIB. In this example, the engine is an eight-cylinder engine with eight corresponding direct or port fuel injectors. Direct injection or port injection may be carried out at evenly spaced intervals of 90° crank angle. The regular injection interval is given by 720° divided by the number of injectors. This pattern of fuel injection may be repeated on a 720° cycle. However, in order to prolong inter-injection periods for improved estimations of average inter-injection pressure, the injection timings may be adjusted and the two consecutive injections may no longer be spaced 90° apart.

At 502, the fuel injectors in the engine may be divided in sets of four in a rolling pattern. As an example, the second, third, fourth, and fifth injectors are in set 1, sixth, seventh, eighth, and first injectors are in set 2, and so on. In this way, each set includes an injector one, an injector two, an injector three, and an injector four.

At 504, fuel may be injected from an injector one of the first set of injectors with timing advanced by a third amount of crank angles relative to the original injection timing of the injector one. In one example, the third amount may be given by 720° divided by the number of engine cylinders. In an engine with eight engines, the third amount may be 90° crank angle. If the original injection timing for that injector is 90°, the fuel may be injected at an adjusted timing of 0°. The controller may send a signal to an actuator of the injector one of the first set of injectors to inject an amount of fuel to the corresponding cylinder at the advanced time. The amount of fuel injected may be based on engine operating conditions such as engine speed, engine load engine temperature, etc. The amount of fuel injected at the advanced time may be the same amount of fuel that would have been injected if the injection timing was not advanced.

At 506, fuel may be injected from an injector two of the first set of injectors without any change in its original injection timing of the injector two. If the original injection timing for that injector is 180° crank angle, the fuel may be injected at 180°. The controller may send a signal to an actuator of the injector two of the first set of injectors to inject an amount of fuel to the corresponding cylinder at the original injection time.

At 508, fuel may be injected from an injector three of the first set of injectors with timing regarded by a fourth amount of crank angles relative to the original injection timing of the injector three. In one example, the fourth amount may be given by 720° divided by the number of engine cylinders. In an engine with eight engines, the fourth amount may be equal to the third amount of 90° crank angle. If the original injection timing for that injector is 270°, the fuel may be injected at an adjusted timing of 360°. The controller may send a signal to an actuator of the injector three of the first set of injectors to inject an amount of fuel to the corresponding cylinder at the retarded time.

At 510, fuel may be injected from an injector four of the first set of injectors without adjustments to the original injection timing of the injector four. If the original injection timing for that injector is 360°, the fuel may be injected at the original timing of 360°. The controller may send a signal to an actuator of the injector four of the first set of injectors to inject an amount of fuel to the corresponding cylinder at the original time.

After injection from injector four of the first set, fuel may be injected from an injector one of the second set of injectors with timing advanced by 90° crank angle relative to its original injection timing. In this way, by retarding the injection timing for the injector three of the first set, maintaining the original injection timing for injector four of the first set, and by advancing the injection timing for injector one of the second set, each of the injector three of the first set, four of the first set, and one of the second set may dispense fuel to respective cylinders at approximately the same time of 360°. If due to limitations in hardware, the three injections may not be possible at the exact same time, the injections may be scheduled as close to each other as possible.

At 512, fuel injection from injector two of the first set (and each set thereafter) may be included in the PBIB as described in FIG. 3. As an example, the injection from injector two of the first set may be the injection_n and the pressure drop after completion of the injection from injector two may be used to learn an error between commanded injection mass and actual injection mass, which may then be used to balance the injectors. The period between injections from injector one and injector two may be used as the preceding interjection period for sampling fuel rail pressure. The period between injections from injector two and injector three may be used as the subsequent interjection period for sampling fuel rail pressure. By advancing injection from the injector one by 90° crank angle relative to the original injection timing of the injector one, the inter-injection period between consecutive injections by injector one and injector two may be spaced apart by a 180° crank angle (instead of 90°) which is an increase of two times. By retarding injection from the injector three by 90° crank angle relative to the original injection timing of the injector three, the inter-injection period between consecutive injections by injector two and injector three may be spaced apart by a 180° crank angle (instead of 90°) which is an increase of two times. By sampling fuel rail pressure over the elongated inter-injection period preceding and following injector two, accuracy of estimation of pressure drop after completion of the injection from injector two may be improved.

FIG. 9 shows a second plot 900 of change in fuel rail pressure and crank angle for fuel injection events corresponding to the method of FIG. 5. The x-axis denotes crank angle in degrees and the y-axis denotes fuel rail pressure. In this example, the original fuel injection interval is 90° crank angle over a cycle of 720° crank angle. The eight cylinders are grouped in sets of four in a rotating manner. As an example, the second, third, fourth, and fifth injectors are grouped as set 1, sixth, seventh, eighth, and first injectors are in set 2, and so on.

The first injection from injector one of the first set may be carried out at time t1, advanced by time x4 from the originally scheduled time of 90° crank angle. Time x4 may be almost 90° crank angle and time t1 may be 0° crank angle. The second injection from the injector two may be carried out at the originally scheduled time of 180° crank angle. The third injection from injector three may be carried out at time t2, retarded by time x5 from the originally scheduled time of 270° crank angle. Time x5 may be almost 90° crank angle and time t2 may be 360° crank angle. The fourth injection from the injector four may be carried out at the originally scheduled time of 360° crank angle (time t3). The first injection from injector one of the second set may be carried out at time t4, advanced by time x4 from the originally scheduled time of 450° crank angle.

Due to the time x4 and x5 being almost 90°, each of the third injection of the first set, the fourth injection of the first set, and the first injection of the second set may be occur at almost 360°. However, due to limitations in hardware, the third injection of the first set, the fourth injection of the first set, and the first injection of the second set may not be carried out at the exact same time and there may be a time difference between the third injection of the first set and the fourth injection of the first set (difference between time t2 and t3) and between the fourth injection of the first set and the first injection of the second set (difference between t3 and t4). For PBIB, as described in FIG. 4, injection from injector two in the first set may be considered and the preceding inter-injection period may be the time period between 0° crank angle and 180° crank angle and the subsequent inter-injection period may be the time period between 180° crank angle and 360° crank angle. The drop in pressure due to a single injection is shown by ΔP.

Figure 7:
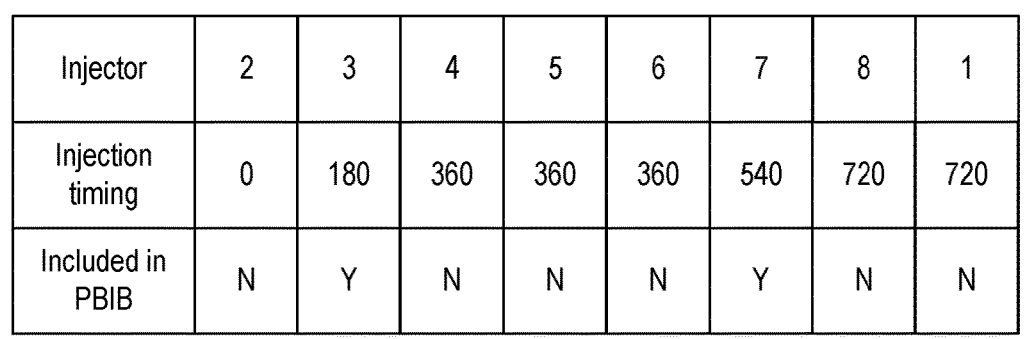
FIG. 7 is a second table of injection timings for fuel injection events corresponding to the method of FIG. 5.

FIG. 7 shows a second table 700 of injection timings for fuel injection events corresponding to the method of FIG. 5. The first row 702 shows each injector in an eight injector engine. The second row 704 shows injection timing for each injector. The third row 706 shows if an injection from an injector is included in PBIB calculations as described in FIG. 3. The eight cylinders are grouped in sets of four in a rotating manner.

The second, third, fourth, and fifth injectors may form a first set, and the sixth, seventh, eighth, and first injectors may form a second set. The second injector (first injector of the first set) dispenses fuel at 0° crank angle advanced by 90° from its original timing, the third injector (second injector of the first set) dispenses fuel at 180° crank angle without adjustments to its original timing, the fourth injector (third injector of the first set) dispenses fuel at 360° crank angle retarded by 90° from its original timing, the fifth injector (fourth injector of the first set) dispenses fuel at 360° crank angle without adjustments to its original timing, the sixth injector (first injector of the second set) dispenses fuel at 360° crank advanced by 90° from its original timing, the seventh injector (second injector of the second set) dispenses fuel at 540° crank angle without adjustments to its original timing, the eighth injector (third injector of the second set) dispenses fuel at 720° crank angle retarded by 90° from its original timing, the first injector (fourth injector of the second set) dispenses fuel at 720° crank angle without adjustments to its original timing.

The injectors for which injection timing is not adjusted and whose preceding and following inter-injection periods were increased may be included in the PBIB calculations. As an example, the third injector (second injector of the first set) and the seventh injector (second injector of the second set) may be first included in the PBIB calculations. As the injector are divided into groups in a cyclic manner, each injector will be subjected to a condition when the injection timing of the injector is not adjusted and the injector may then be included in the PBIB calculations. In this way, by grouping injectors in a rotating manner, each injector may be included in the PBIB calculations.

In the above examples, grouping of three and four injectors have been shown. However, in alternate examples, any number of injectors may be grouped together and injections from one or more injectors may be advanced or retarded to prolong each of a first inter-injection period preceding an injection event included in the PBIB and a second inter-injection period following the injection event included in the PBIB.

FIG. 10 shows a third example method 400 for adjusting injection in fuel injectors during PBIB. In this example, the engine is an eight-cylinder engine with eight corresponding direct and port fuel injectors. This method may be carried out only in engines including both direct injectors and port injectors and wherein fuel injection to each of the cylinders may be carried out by either a direct injector or a port injector without adversely affection operation of the engine. Direct injection or port injection may be carried out at evenly spaced intervals of 90° crank angle. The regular injection interval is given by 720° divided by the number of injectors. This pattern of fuel injection may be repeated on a 720° cycle. However, in order to prolong inter-injection periods for improved estimations of average inter-injection pressure, injections via one or more direct injectors may be skipped such that the inter-injection period between two consecutive direct injections may be increased.

At 1002, fuel may be injected from first direct injector coupled to a first cylinder at 0° crank angle without any change in its original injection timing. The controller may send a signal to an actuator of the first injector to inject an amount of fuel to the corresponding cylinder. The amount of fuel injected may be based on engine operating conditions such as engine speed, engine load engine temperature, etc. During this injection, the port injection may not be carried out to dispense fuel to the first cylinder.

At 1004, fuel injection from the second direct injector coupled to the second cylinder (scheduled at 90° crank angle) may be skipped. In order to deliver fuel to the second cylinder, at 1006, fuel may be injected via one or more port injectors at 90° crank angle to compensate for the fuel not being directly injected to the second cylinder.

At 1008, fuel may be injected from third direct injector coupled to a third cylinder at 180° crank angle without any change in its original injection timing. The controller may send a signal to an actuator of the third injector to inject an amount of fuel to the corresponding cylinder. During this injection, the port injection may not be carried out to dispense fuel to the third cylinder.

At 1010, fuel injection from the fourth direct injector coupled to the fourth cylinder (scheduled at 270° crank angle) may be skipped. In order to deliver fuel to the fourth cylinder, at 1012, fuel may be injected via one or more port injectors at 270° crank angle to compensate for the fuel not being directly injected to the fourth cylinder. In this way, fuel delivery to cylinders may be continued alternating between direct injection and port injection. By skipping alternate injections, the inter-injection periods between two consecutive direct injections or two consecutive port injections may be doubled. In this example, one direct injection between two direct injection events is skipped. In another example, two or more direction injections between two direct injection events may be skipped to further prolong the time period between two successive injection events. During each skipped direct injection, fuel may be delivered to the corresponding cylinder via port injection.

At 1014, fuel injection from the first and third direct injectors may be included in the PBIB as described in FIG. 3. As an example, the injection from the first injector one may be the injection_n and the pressure drop after completion of the injection from the first injector one may be used to learn an error between commanded injection mass and actual injection mass, which may then be used to balance the injectors. The first inter-injection period between injection from the first injector and an immediately preceding injection (such as from the seventh injector) and a second inter-injection period between injection from the first injector and an immediately subsequent injection (such as from the third injector) may be used to estimate the pressure drop during fuel injection from the first injector.

Also, instead of including injections from the direct injectors, in order to carry out PBIB with port injectors, fuel injection from two consecutive port injections may be included in the PBIB as described in FIG. 3. The period between two consecutive port injections may be used as the interjection period for sampling fuel rail pressure. By skipping alternate injections, the inter-injection periods between two consecutive direct injections or two consecutive port injections may be doubled. By sampling fuel rail pressure over the elongated inter-injection period, accuracy of estimation pressure drop after completion of the injection from injector one may be improved.

Figure 11:
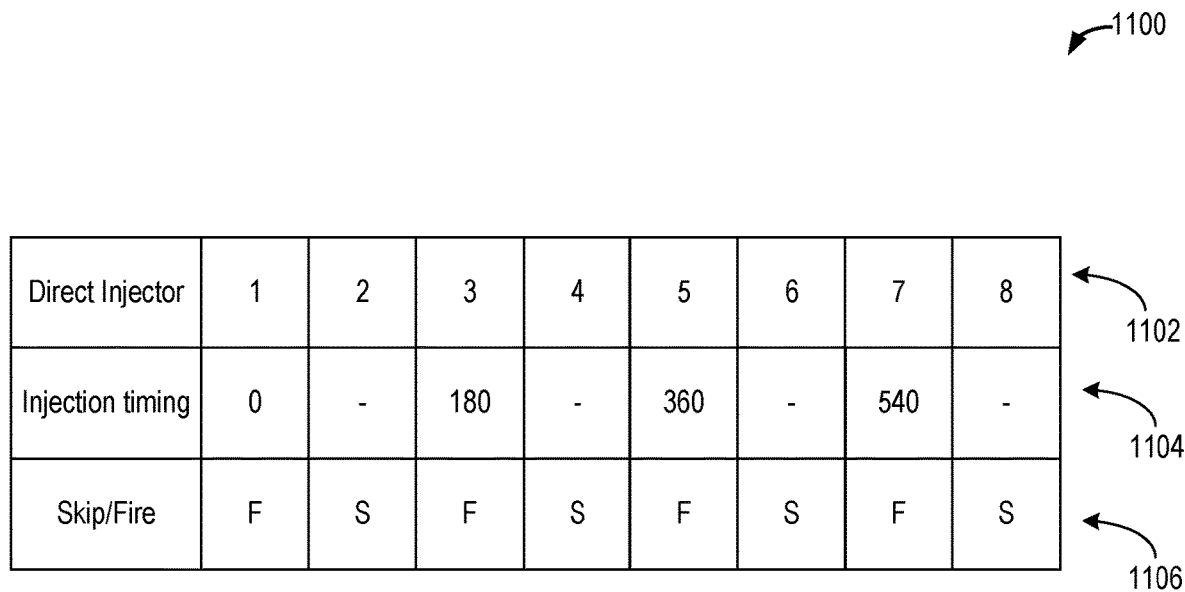
FIG. 11 is a third table of injection timings for fuel injection events corresponding to the method of FIG. 10.
Figure 12:
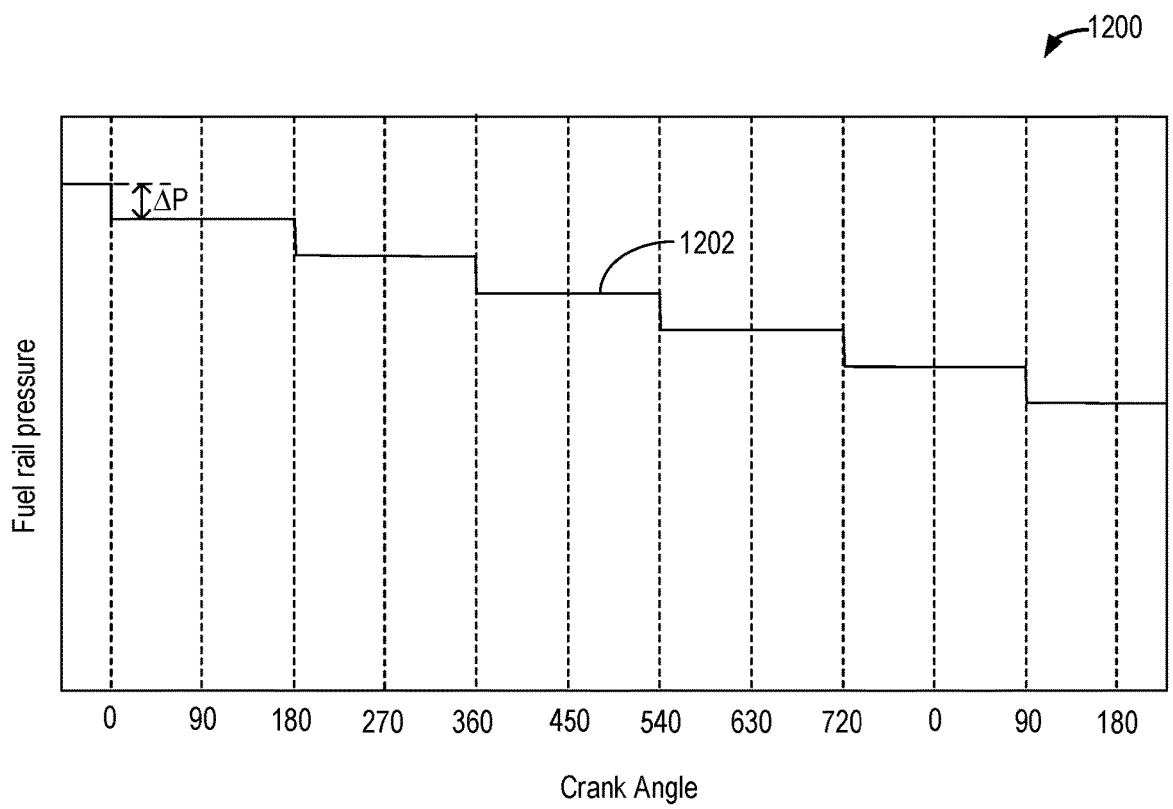
FIG. 12 shows a third plot of fuel rail pressure and crank angle for fuel injection events corresponding to the method of FIG. 10.

FIG. 11 shows is a first table 1100 of injection timings for fuel injection events from direct injectors corresponding to the method of FIG. 10. The first row 1002 shows each direct injector (DI) in an eight-injector engine. The second row 1004 shows injection timing for each injector. The third row 1006 shows if fuel is dispensed from an injector or if injection from the injector is skipped.

The first DI dispenses fuel at 0° crank angle, fuel injection from the second DI is skipped (originally scheduled at 90° crank angle), the third DI dispenses fuel at 180° crank angle, fuel injection from the fourth DI is skipped (originally scheduled at 270° crank angle), the fifth DI dispenses fuel at 360° crank angle, fuel injection from the sixth DI is skipped (originally scheduled at 450° crank angle), the seventh DI dispenses fuel at 540° crank angle, and fuel injection from the eighth DI is skipped (originally scheduled at 630° crank angle).

The DI injectors that dispensed fuel to the corresponding cylinders may be included in the PBIB calculations. As an example, the first injector, the third injector, the fifth injector, and the seventh injector may be first included in the PBIB calculations. Since an injector is skipped during injection, the period between two successive injections via a DI may be doubled. By skipping injections in a rotating manner, each injector may be included in the PBIB calculations.

FIG. 12 shows a third plot 1200 of change in fuel rail pressure for fuel injection events corresponding to the method of FIG. 10. The x-axis denotes crank angle in degrees and the y-axis denotes fuel rail pressure in a fuel rail coupled to direct injectors. Line 1202 shows a change in fuel rail pressure during injection via the direct injectors. In this example, fuel injection via a direct injector (DI) is scheduled at intervals of 90° crank angle over a cycle of 720° crank angle.

Injection from the first DI may be carried out at the scheduled time of 0° crank angle. Injection from the second DI, scheduled at 90° crank angle may be skipped. The next injection may be carried out via the third DI at 180° crank angle. Injection from the fourth DI, scheduled at 270° crank angle may be skipped. In this way, injections from alternate DIs may be carried out while skipping alternative injections. For PBIB, as described in FIG. 10, injection from alternate DIs (that dispense fuel) may be considered and the inter-injection period may be between two injections. In this example, the inter-injection period is 180° crank angle (double of originally scheduled inter-injection period). The drop in pressure due to a single injection is shown by ΔP.

In this way, by adjusting injection timing for an injector or selectively skipping injection for certain injectors, an inter-injection period between two consecutive injections may be increased. An increase in the inter-injection period would reduce errors in computation of average inter-injection pressure due to both Gaussian noises and pressure oscillations from resonance. By accurately estimating average inter-injection pressure, accuracy of estimation of an error between commanded injection mass and actual injection mass may be improved and the fuel injectors may be balanced accordingly. Overall, by improving pressure based injection balancing, fuel efficiency and emissions quality may be improved.

In one example, a method for operating an engine in a vehicle, comprising: adjusting an injection timing and an amount of time between consecutive fuel injections in response to a request to balance amounts of fuel injected by a plurality of fuel injectors. In the preceding example, additionally or optionally, adjusting the injection timing includes selectively advancing or retarding timing of one or more fuel injectors of the plurality of fuel injectors relative to their respective original injection timings to increase the amount of time between two consecutive fuel injections. In any or all of the preceding examples, the method further comprising, additionally or optionally, during balancing of the amount of fuel injected, estimating a first fuel mass error of a second fuel injector based on each of a first average fuel rail pressure estimated between a second fuel injection via the second fuel injector and an immediately preceding first fuel injection via a first fuel injector and a second average fuel rail pressure estimated between the second fuel injection via the second fuel injector and an immediately subsequent third fuel injection via a third fuel injector. In any or all of the preceding examples, additionally or optionally, a first injection timing of the immediately preceding first fuel injection is advanced from its original injection timing, and wherein a third injection timing of the immediately subsequent third fuel injection is retarded from its original injection timing, the respective original injection timing for each fuel injector based on a configuration of a high pressure pump of a fuel system and a number of cylinders in the engine. In any or all of the preceding examples, additionally or optionally, a first amount of time between the second fuel injection and the immediately subsequent, third fuel injection is longer than an original amount of time by a first duration, the original amount of time based on the configuration of the high pressure pump and the number of cylinders in the engine, the first duration being equal to a number of crank angles by which the immediately subsequent, third fuel injection is retarded from its original injection timing; and wherein a second amount of time between the second fuel injection and the immediately preceding first fuel injection is longer than the original amount of time by a second duration, the second duration being equal to a number of crank angles by which the immediately preceding first fuel injection is advanced from its original injection timing, and wherein the first duration is equal to the second duration. In any or all of the preceding examples, additionally or optionally, adjusting engine fueling includes estimating an average injector fuel mass error based on a fuel mass error for each fuel injector, and updating a transfer function for each fuel injector of the plurality of fuel injectors based on the average injector fuel mass error to provide a common error for each fuel injector. In any or all of the preceding examples, additionally or optionally, further comprising, during balancing of the amount of fuel injected, excluding one or more fuel injections from the one or more fuel injectors with reduced preceding and/or following inter-injection periods from estimation of the average injector fuel mass error. In any or all of the preceding examples, additionally or optionally, the plurality of fuel injectors are direct fuel injectors or port fuel injectors.

In another example, a method for an engine in a vehicle, comprises: dividing all fuel injectors into groups in a rolling pattern, advancing and retarding fuel injection timing, relative to respective original injection timings, for one or more fuel injectors in a group while maintaining an original injection timing for at least one fuel injector in the group, learning a drop in pressure during a fuel injection from a fuel injector at the original injection timing based on each of a first average fuel rail pressure during a first inter-injection period between the fuel injection and an immediately preceding fuel injection and a second another average fuel rail pressure during a second inter-injection period between the fuel injection and an immediately subsequent fuel injection, the immediately subsequent fuel injection retarded relative to its original injection timing and the immediately preceding fuel injection advanced relative to its original injection timing. In the preceding example, additionally or optionally, the original injection timing for each fuel injector is based on an order of firing of cylinders in the engine, configuration of a high pressure pump of a fuel system, and a number of cylinders. In any or all of the preceding examples, additionally or optionally, dividing all the fuel injectors into groups includes dividing all the fuel injectors in a first set of three injectors, injecting fuel from a first injector of the first set with the fuel injection timing advanced from its original injection timing by a first amount, injecting fuel from a second injector of the first set without adjusting its original injection timing, and injecting fuel from a third injector of the first set with the fuel injection timing retarded from its original injection timing by a second amount. In any or all of the preceding examples, additionally or optionally, the drop in the pressure is learned for the fuel injection from the second injector of the first set, and wherein the first inter-injection period is between the fuel injection from the first injector of the first set and the fuel injection from the second injector of the first set, and wherein the second inter-injection period is between the fuel injection from the second injector of the first set and the fuel injection from the third injector of the first set. In any or all of the preceding examples, additionally or optionally, dividing all the fuel injectors into groups includes dividing all the fuel injectors in a second set of four injectors, injecting fuel from a first injector of the second set with the fuel injection timing advanced from its original injection timing by a third amount, injecting fuel from a second injector of the second set without adjusting its original injection timing, injecting fuel from a third injector of the second set with the fuel injection timing retarded from its original injection timing by a fourth amount, and injecting fuel from a fourth injector of the second set without adjusting its original injection timing. In any or all of the preceding examples, additionally or optionally, the drop in pressure is learned for the fuel injection from the second injector of the second set, and wherein the first inter-injection period is between the fuel injection from the first injector of the second set and the fuel injection from the second injector of the second set, and wherein the second inter-injection period is between the fuel injection from the second injector of the second set and the fuel injection from the third injector of the second set. In any or all of the preceding examples, additionally or optionally, each of third amount and the fourth amount are larger than each of the first amount and the second amount, and wherein each of the first amount, the second amount, the third amount, and the fourth amount are a function of a total number of fuel injectors. In any or all of the preceding examples, additionally or optionally, each of the first amount and the second amount is 45° crank angle and each of the third amount and the fourth amount is 90° crank angle for an engine with eight cylinders. In any or all of the preceding examples, the method further comprising, additionally or optionally, estimating an injector fuel mass error for the fuel injector based on the drop in pressure, learning the injector fuel mass error for each remaining fuel injector, and estimating an average injector fuel mass error based on the injector fuel mass error for each fuel injector, and adjusting fueling from each fuel injector based on the learned injector fuel mass error for a given fuel injector relative to the average injector fuel mass error.

In yet another example, a system for an engine, comprises: a controller with computer-readable instructions stored on non-transitory memory that when executed cause the controller to: during balancing amounts of fuel injected by a plurality of fuel injectors coupled to a fuel rail of a fuel system, inject fuel to cylinders from alternate fuel injectors of a first set of injectors, skipping one or more intermediate injections between two injections from the first set of injectors, estimate injector fuel mass error for a first injector of the first set of injectors injecting fuel based on an average pressure of the fuel rail during each of a first inter-injection period between a first injection from the first injector and an immediately previous injection and a second inter-injection period between the first injection and an immediately subsequent injection. The preceding example further comprising, additionally or optionally, during skipping one or more intermediate injections between two injections from the first set of injectors, injecting fuel to each cylinder not receiving fuel from the first set of injectors via a second set of fuel injectors. In any or all of the preceding examples, additionally or optionally, the first set of fuel injectors including direct injectors and the second set of fuel injectors including port injectors, and wherein the inter-injection period is at least 180° crank angle, the engine including eight cylinders.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating an engine in a vehicle, comprising:
adjusting an injection timing and an amount of time between consecutive fuel injections in response to a request to balance amounts of fuel injected by a plurality of fuel injectors.

2. The method of claim 1, wherein adjusting the injection timing includes selectively advancing or retarding timing of one or more fuel injectors of the plurality of fuel injectors relative to their respective original injection timings to increase the amount of time between two consecutive fuel injections.

3. The method of claim 2, further comprising, during balancing of the amount of fuel injected, estimating a first fuel mass error of a second fuel injector based on each of a first average fuel rail pressure estimated between a second fuel injection via the second fuel injector and an immediately preceding first fuel injection via a first fuel injector and a second average fuel rail pressure estimated between the second fuel injection via the second fuel injector and an immediately subsequent third fuel injection via a third fuel injector.

4. The method of claim 3, wherein a first injection timing of the immediately preceding first fuel injection is advanced from its original injection timing, and wherein a third injection timing of the immediately subsequent third fuel injection is retarded from its original injection timing, the respective original injection timing for each fuel injector based on a configuration of a high pressure pump of a fuel system and a number of cylinders in the engine.

5. The method of claim 4, wherein a first amount of time between the second fuel injection and the immediately subsequent third fuel injection is longer than an original amount of time by a first duration, the original amount of time based on the configuration of the high pressure pump and the number of cylinders in the engine, the first duration being equal to a number of crank angles by which the immediately subsequent third fuel injection is retarded from its original injection timing; and
wherein a second amount of time between the second fuel injection and the immediately preceding first fuel injection is longer than the original amount of time by a second duration, the second duration being equal to a number of crank angles by which the immediately preceding first fuel injection is advanced from its original injection timing, and wherein the first duration is equal to the second duration.

6. The method of claim 3, wherein adjusting engine fueling includes estimating an average injector fuel mass error based on a fuel mass error for each fuel injector, and updating a transfer function for each fuel injector of the plurality of fuel injectors based on the average injector fuel mass error to provide a common error for each fuel injector.

7. The method of claim 6, further comprising, during balancing of the amount of fuel injected, excluding one or more fuel injections from the one or more fuel injectors with reduced preceding and/or following inter-injection periods from estimation of the average injector fuel mass error.

8. The method of claim 1, wherein the plurality of fuel injectors are direct fuel injectors or port fuel injectors.

9. A method for an engine in a vehicle, comprising:
dividing all fuel injectors into groups in a rolling pattern;
advancing and retarding fuel injection timing, relative to respective original injection timings, for one or more fuel injectors in a group while maintaining an original injection timing for at least one fuel injector in the group;
learning a drop in pressure during a fuel injection from a fuel injector at the original injection timing based on each of a first average fuel rail pressure during a first inter-injection period between the fuel injection and an immediately preceding fuel injection and a second another average fuel rail pressure during a second inter-injection period between the fuel injection and an immediately subsequent fuel injection, the immediately subsequent fuel injection retarded relative to its original injection timing and the immediately preceding fuel injection advanced relative to its original injection timing.

10. The method of claim 9, wherein the original injection timing for each fuel injector is based on an order of firing of cylinders in the engine, a configuration of a high pressure pump of a fuel system, and a number of cylinders.

11. The method of claim 9, wherein dividing all the fuel injectors into groups includes dividing all the fuel injectors in a first set of three injectors, injecting fuel from a first injector of the first set with the fuel injection timing advanced from its original injection timing by a first amount, injecting fuel from a second injector of the first set without adjusting its original injection timing, and injecting fuel from a third injector of the first set with the fuel injection timing retarded from its original injection timing by a second amount.

12. The method of claim 11, wherein the drop in the pressure is learned for the fuel injection from the second injector of the first set, and wherein the first inter-injection period is between the fuel injection from the first injector of the first set and the fuel injection from the second injector of the first set, and wherein the second inter-injection period is between the fuel injection from the second injector of the first set and the fuel injection from the third injector of the first set.

13. The method of claim 11, wherein dividing all the fuel injectors into groups includes dividing all the fuel injectors in a second set of four injectors, injecting fuel from a first injector of the second set with the fuel injection timing advanced from its original injection timing by a third amount, injecting fuel from a second injector of the second set without adjusting its original injection timing, injecting fuel from a third injector of the second set with the fuel injection timing retarded from its original injection timing by a fourth amount, and injecting fuel from a fourth injector of the second set without adjusting its original injection timing.

14. The method of claim 13, wherein the drop in pressure is learned for the fuel injection from the second injector of the second set, and wherein the first inter-injection period is between the fuel injection from the first injector of the second set and the fuel injection from the second injector of the second set, and wherein the second inter-injection period is between the fuel injection from the second injector of the second set and the fuel injection from the third injector of the second set.

15. The method of claim 13, wherein each of third amount and the fourth amount are larger than each of the first amount and the second amount, and wherein each of the first amount, the second amount, the third amount, and the fourth amount are a function of a total number of fuel injectors.

16. The method of claim 13, wherein each of the first amount and the second amount is 45° crank angle and each of the third amount and the fourth amount is 90° crank angle for an engine with eight cylinders.

17. The method of claim 9, further comprising, estimating an injector fuel mass error for the fuel injector based on the drop in pressure, learning the injector fuel mass error for each remaining fuel injector, and estimating an average injector fuel mass error based on the injector fuel mass error for each fuel injector, and adjusting fueling from each fuel injector based on the learned injector fuel mass error for a given fuel injector relative to the average injector fuel mass error.

18. A system for an engine, comprising:
a controller with computer-readable instructions stored on non-transitory memory that when executed cause the controller to:
during balancing amounts of fuel injected by a plurality of fuel injectors coupled to a fuel rail of a fuel system;
inject fuel to cylinder injectors from alternate fuel injectors of a first set of injectors, skipping one or more intermediate injections between two injections from the first set of injectors;
estimate injector fuel mass error for a first injector of the first set of injectors injecting fuel based on an average pressure of the fuel rail during each of a first inter-injection period between a first injection from the first injector and an immediately previous injection and a second inter-injection period between the first injection and an immediately subsequent injection.

19. The system of claim 18, further comprising, during skipping one or more intermediate injections between two injections from the first set of injectors, the controller includes further instructions to: inject fuel to each cylinder not receiving fuel from the first set of injectors via a second set of fuel injectors.

20. The system of claim 19, wherein the first set of fuel injectors includes direct injectors and the second set of fuel injectors includes port injectors, wherein the inter-injection period is at least 180° crank angle, and wherein the engine includes eight cylinders.

* * * * *